United States Patent

Yuyama et al.

[11] Patent Number: 5,825,408
[45] Date of Patent: *Oct. 20, 1998

[54] PORTABLE COMPACT IMAGING AND DISPLAYING APPARATUS

[75] Inventors: Masami Yuyama, Oome; Akihiro Tsukamoto, Hamura; Shigenori Morikawa, Kokubunji, all of Japan

[73] Assignee: Casio Computer Co., Ltd., Tokyo, Japan

[*] Notice: The term of this patent shall not extend beyond the expiration date of Pat. No. 5,612,732.

[21] Appl. No.: 587,857

[22] Filed: Jan. 11, 1996

Related U.S. Application Data

[62] Division of Ser. No. 210,562, Mar. 18, 1994, Pat. No. 5,612,732.

[30] Foreign Application Priority Data

| Mar. 31, 1993 | [JP] | Japan | 5-98967 |
| Apr. 28, 1993 | [JP] | Japan | 5-124935 |
| Apr. 28, 1993 | [JP] | Japan | 5-124937 |

[51] Int. Cl.⁶ .................................................. H04M 11/00
[52] U.S. Cl. ........................... 348/14; 348/838; 455/556; 455/557
[58] Field of Search ................................ 348/14, 17, 13, 348/552, 18, 19; 379/53, 93.05, 93.07; 455/556, 557

[56] References Cited

U.S. PATENT DOCUMENTS

| 4,336,524 | 6/1982 | Levine . |
| 4,387,271 | 6/1983 | Artom . |
| 4,485,400 | 11/1984 | Lemelson et al. ........................ 348/14 |
| 4,560,833 | 12/1985 | Weber et al. . |
| 4,639,225 | 1/1987 | Washizuka . |
| 4,928,300 | 5/1990 | Ogawa et al. ........................... 348/14 |
| 4,978,888 | 12/1990 | Anandan et al. . |
| 5,077,784 | 12/1991 | Fujita et al. . |
| 5,127,041 | 6/1992 | O'Sullivan .......................... 379/93.05 |
| 5,189,691 | 2/1993 | Dunlap . |

(List continued on next page.)

FOREIGN PATENT DOCUMENTS

| 0500091 A2 | 8/1992 | European Pat. Off. . |
| 2-39693 | 2/1990 | Japan . |
| 0123152 | 5/1991 | Japan ...................................... 379/53 |
| 0201690 | 9/1991 | Japan ...................................... 379/53 |
| 3-216092 | 9/1991 | Japan . |
| 2206767 | 1/1989 | United Kingdom . |

OTHER PUBLICATIONS

Net Nachrichten Elektronik Und Telematik, vol. 44, No. 3, Mar., 1990, Heidelberg, Germany, pp. 80–81, Michael Winter, "Komprimierung Ohne Kompromisse".

I.E.E.E. Journal On Selected Areas In Communications, vol. Sac–4, No. 4, Jul., 1986 New York, New York USA, pp. 633–639, Hans–Jurgen Mosel "Home Communications Systems".

I.E.E.E. Global Telecommunications Conference & Exhibition, vol. 1, Nov., 28, 1988, Hollywood, Florida pp. 32–36, Komiya et al, "An Approach To The Multifunction Graphic Terminal For The ISDN Environment".

*Primary Examiner*—Stella Woo
*Attorney, Agent, or Firm*—Frishauf, Holtz, Goodman, Langer & Chick

[57] ABSTRACT

An imaging apparatus has a portable monitor. Image data taken by the imaging apparatus is compressed and stored. The monitor serves as a view finder which displays image data which is being observed, and also serves to reproduce and display image data stored in a memory. A removable modem is coupled to the imaging apparatus. When the modem is coupled to the imaging apparatus, image data obtained by photography is transmitted through the telephone line. Like the image data, voice data can be stored in the memory and transmitted through the modem. The image data and the voice data can be compressed and combined with each other. By transmitting and receiving such synthesized data, the imaging apparatus can be used as a TV telephone.

2 Claims, 24 Drawing Sheets

U.S. PATENT DOCUMENTS

| | | | |
|---|---|---|---|
| 5,231,501 | 7/1993 | Sakai | 348/231 |
| 5,318,257 | 6/1994 | Tani | 248/125 |
| 5,347,305 | 9/1994 | Bush et al. | 348/14 |
| 5,408,520 | 4/1995 | Clark et al. | 379/93.07 |
| 5,485,504 | 1/1996 | Ohnsorge | 348/14 |
| 5,491,507 | 2/1996 | Umezawa et al. | 348/14 |
| 5,528,285 | 6/1996 | Morikawa et al. | |

ERROR DIFFUSION
FILTER

ERROR IN ● PORTION
IS DIFFUSED TO THE
PLACES IN FIGURE AT
RATES OF THE VALUES
INDICATED x (1/16)

PORTABLE COMPACT IMAGING AND DISPLAYING APPARATUS

This is a division application Ser. No. 08/210,562 filed Mar. 18, 1994 now U.S. Pat. No. 5,612,732.

BACKGROUND OF THE INVENTION

1. Field of the Invention

The present invention relates to a television receiver, and more particularly to a portable television receiver capable of transmitting image data through a communication channel.

2. Description of the Related Art

Recently, liquid-crystal television sets using a liquid-crystal display unit in the display section in place of a cathode ray tube (CRT), one of typical display devices, have become popular because of the relative lightness and thinness of the device. For example, liquid-crystal display units are widely used in the fields of car use and sports watching. Particularly, such miniaturized liquid-crystal television sets which fit in a breast pocket of the shirt are now on the market. People may go to work or on a business trip, carrying those TV sets with them to watch a TV program whenever they want to.

With such conventional liquid-crystal TV sets, however, since TV waves are received and only the received image data is displayed on the liquid-crystal display unit, the images that people can see on the liquid-crystal TV set are limited to those televised.

In these days, people often use the telephone at a going-out place and can of course transmit only sound to the other party on the phone.

It is unreasonable and inconvenient that people carrying liquid-crystal TV sets with them can transmit only sound to the other party on the telephone without transmitting image data.

SUMMARY OF THE INVENTION

Accordingly, the object of the present invention is to provide a portable television receiver capable of transmitting specific image data together with sound by means of a communication channel.

According to an aspect of the present invention, there is provided a portable television receiver comprising: a television tuner; a display section for displaying the image received by the television tuner; camera means; means for causing the image taken by the camera means to be displayed on the display section; means for compressing the image taken by the camera means; means for modulating the image compressed by the compressing means into an audio signal; and speaker means for outputting the image modulated by the modulating means into an audio signal, wherein the speaker means is pressed against the mouthpiece of a telephone to transmit the image.

According to another aspect of the present invention, there is provided a portable television receiver comprising: a case body; a television tuner; a display section for displaying the image received by the television tuner; a camera section; means for causing the image taken by the camera section to be displayed on the display section; means for binarizing the image taken by the camera section; and a facsimile transmission block containing a facsimile modem for transmitting the image binarized by the binarizing means to a facsimile.

According to still another aspect of the present invention, there is provided a portable television receiver comprising: a case containing: a television tuner; a display section for displaying the image received by the television tuner; camera means; means for causing the image taken by the camera means to be displayed on the display section; means for compressing the image taken by the camera means; and means for modulating the image compressed by the compressing means; and a telephone line jack provided on the case and connected to a telephone line in order to output the image data modulated by the modulating means.

According to further aspect of the present invention, there is provided a portable television receiver comprising: a case containing: a television tuner; means for displaying the image received by the television tuner; camera means; means for compressing the image taken by the camera means; means for modulating the image compressed by the compressing means; and means for demodulating the image modulated by the modulating means; means for expanding the image demodulated by the demodulating means; and means for displaying selectively one of the image taken by the camera means and the image expanded by the expanding means; and a telephone line jack connected to a telephone line wherein outputting the image modulated by the modulating means through the telephone line jack to a telephone line and demodulating by the demodulating means the modulated image inputted from the telephone line through the telephone line jack enables the receiver to function as a videophone.

In the present invention, the above-mentioned configuration enables even a portable television receiver to transmit image data using a communication channel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will be explained hereinafter referring to the accompanying drawings.

With reference to FIGS. 1 to 4, a portable television receiver according to the first embodiment of the present invention will be explained hereinafter.

First, an arrangement of the first embodiment of the present invention will be described hereinbelow.

Figure 1:
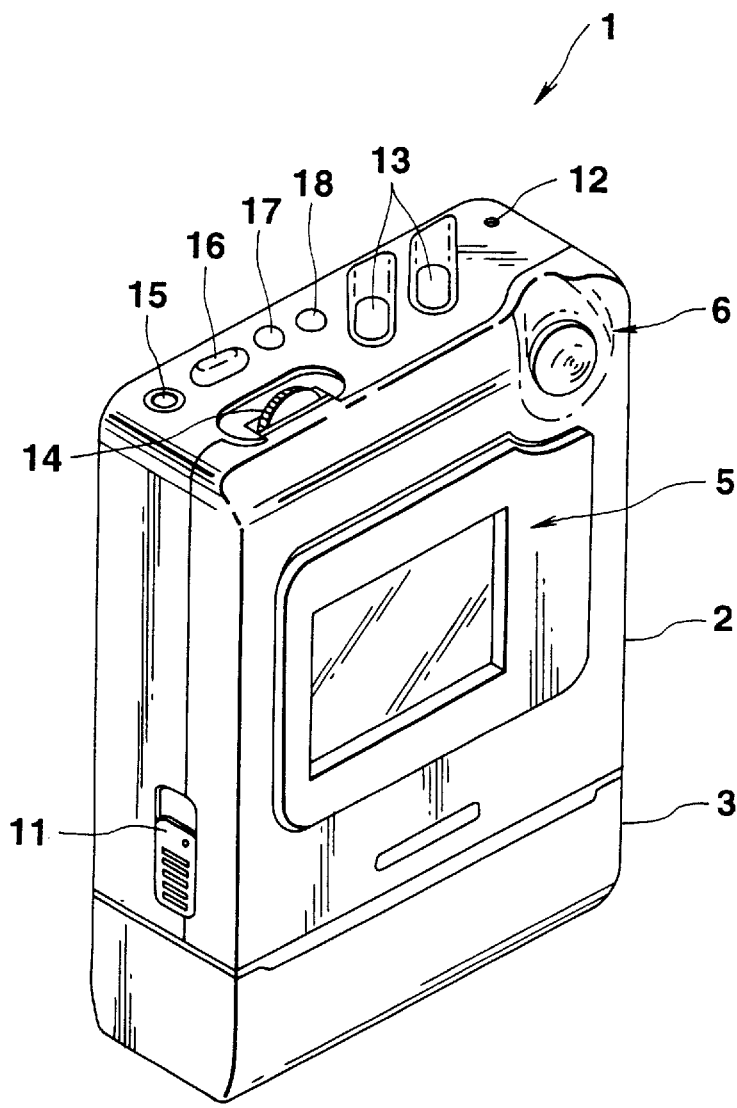
FIG. 1 is a perspective view of a portable television receiver according to a first embodiment of the present invention, viewed from the front.
Figure 2:
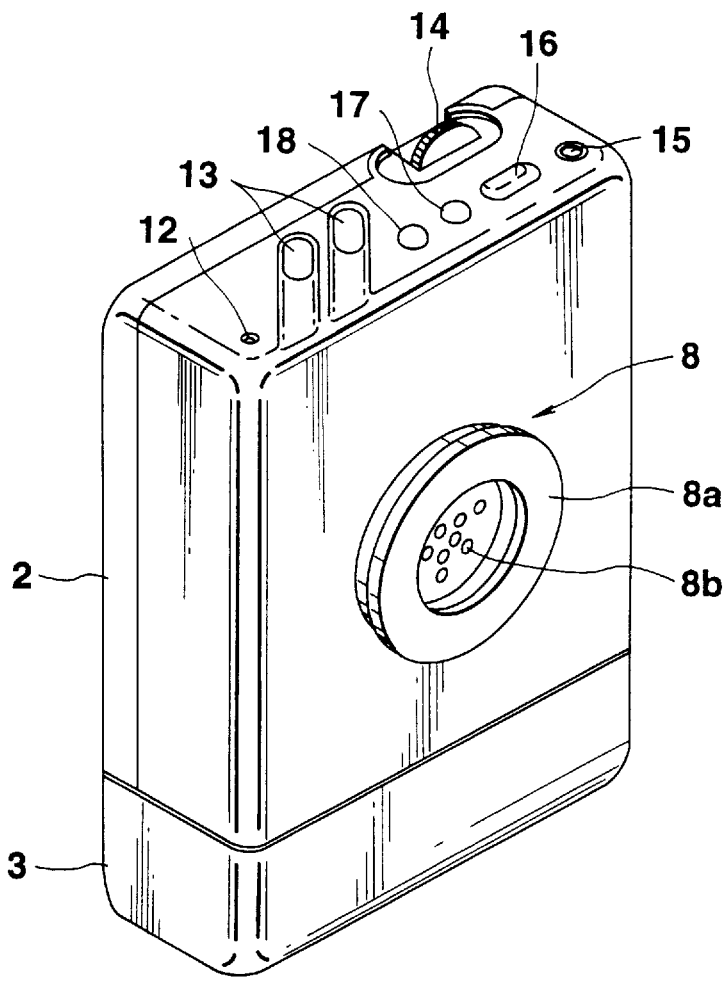
FIG. 2 is a perspective view of the portable television receiver of the first embodiment, viewed from the back.

FIGS. 1 and 2 show an outward appearance of the portable television receiver of the first embodiment, viewed from the front and the back, respectively. Hereinafter, a case where an analog-telephone ordinary subscriber's line is used as a communication channel will be described. In FIG. 1, the portable television receiver 1 is basically composed of a receiver body 2 and a power supply section 3. The receiver body 2 is made up of a reinforced plastic enclosure measuring 65 mm in height, 60 mm in width and 24 mm in thickness. On the front of the body 2, a liquid-crystal display section 5 and a camera section 6 are integrally provided, as shown in FIG. 1. On the back of the body 2, a speaker section 8 is integrally provided, as shown in FIG. 2. A power supply section 3, when attached to the bottom of the receiver body 2, supplies a specific current to the body 2. Specifically, the power supply section 3 is made up of a battery pack incorporating dedicated nickel-cadmium (Ni—Cd) batteries. While in the first embodiment, explanation is given using a battery pack with built-in dedicated nickel-cadmium batteries as the power-supply section 3 attached to the bottom of the body 2, the invention is not limited to this example. For instance, the power-supply section 3 may be composed of a dry-battery pack containing five size AAA alkaline batteries, an AC adapter using an AC (alternating current) power supply, or a car adapter using a DC (direct current) battery in the cigarette lighter of a car. The liquid-crystal display section 5 is a TFT active matrix liquid-crystal display unit having a 1.4-inch screen. This display section is provided with a high-resolution color liquid-crystal display panel having 220×279=61380 pixels where each set of pixels corresponding to R (Red), G (Green), and B (Blue) known as primary colors is arranged in a delta. The camera section 6, as shown in FIG. 1, is a compact CCD (Charge Coupled Device) camera installed detachably on the same plane as the screen of the liquid-crystal display section 5. The camera section 6 is connected to the receiver body 2 with a video cable. The speaker section 8 is composed of, e.g., a dynamic cone-type loudspeaker, and outputs sound data from speaker holes 8b made inside a ringed noise-insulating wall 8a provided on the back of the body 2 as shown in FIG. 2. While in the first embodiment, explanation is given using a dynamic cone-type loudspeaker as the speaker section 8, the invention is not restricted to this example. For instance, a speaker used for the speaker section 8 may be an entire surface-driven-type electrostatic or flat loudspeaker or a dome loudspeaker.

As shown in FIG. 1, the receiver body 2 is further provided with various switches: they include a power switch 11, a power indicator 12, a tuning button 13, a volume control dial 14, an earphone terminal 15, a video switch 16, a video-mode select switch 17, and an image taking-in switch 18. The power switch 11 is used to determine whether or not the voltage supplied from the power-supply section 3 is applied to the portable television receiver 1. The power indicator 12 is made up of LEDs (Light Emitting Diodes) and lights up when the power switch 11 is on. The tuning button 13 is used to increase or decrease the tuning frequency. The volume control dial 14 is used to control the earphone volume. The earphone terminal 15 is a terminal for connecting to an earphone also serving as a wire antenna, and acts as an antenna terminal. The video switch 16 is a toggle switch for instructing the liquid-crystal display section 5 whether to display an image on the LCD screen or not. The video-mode select switch 17 is a switch for choosing one, as the image to be displayed on the liquid-crystal display section 5, among the televised image (the television mode), the image data taken in by the camera section 6 (the camera mode), and the image data already stored in a memory (the transmission mode). The switch changes from the television mode to the camera mode, and to the transmission mode each time the switch is pressed. The image taking-in switch 18 is a switch for indicating whether the image on the liquid-crystal display section 5 is to be stored as the image data in a particular memory or the image data is to be transmitted in the transmission mode.

Figure 3:
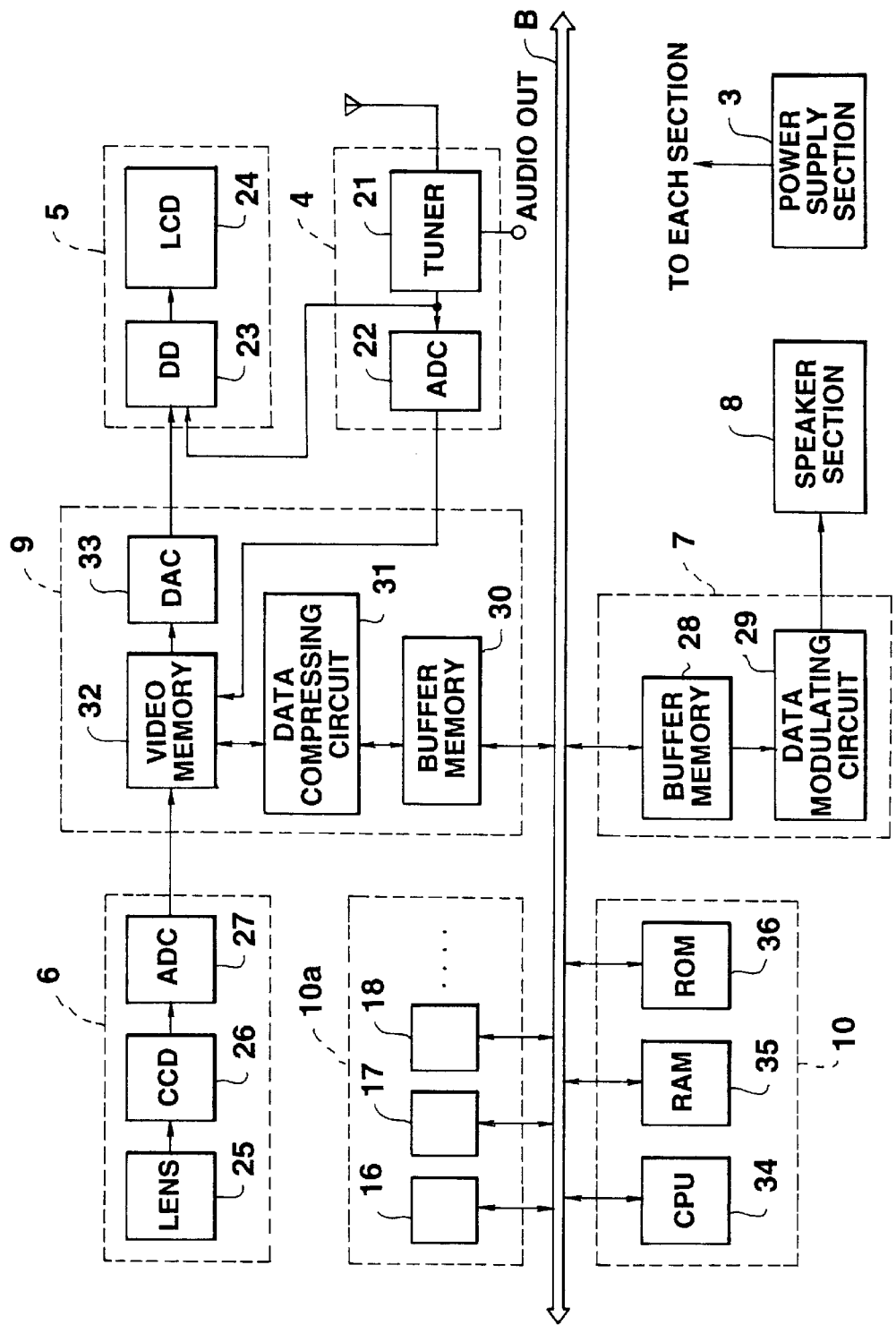
FIG. 3 is a block diagram of the primary portion of the portable television receiver of the first embodiment.

FIG. 3 is a schematic block diagram of the portable television receiver shown in FIGS. 1 and 2. In FIG. 3, the portable television receiver 1 comprises the power supply section 3, a TV tuner section 4, the liquid-crystal display section 5, the camera section 6, a modulating section 7, the speaker section 8, an image compressing section 9, a control section 10, and a key operation section 10a. The modulating section 7, the speaker section 8, and the image compressing section 9, the control section 10, and the key operation section 10a are each connected to a bus B.

The power supply section 3 is composed of a battery pack containing nickel-cadmium (Ni—Cd) batteries, as mentioned earlier. The power supply section 3, when the power switch 11 is turned on, supplies a specific voltage to each section of the receiver body 2.

The TV tuner section 4 is made up of a tuner 21 and an ADC 22. The tuner 21 selectively receives a particular TV wave and outputs the received signal to a DD23 (explained later) of the liquid-crystal display section 5. The tuner also outputs the video signal to a video memory 32 in the image compressing section 9 via the ADC 22. The ADC 22 converts the analog video signal supplied from the tuner 21 into a digital signal. In FIG. 3, the audio signal (AUDIO OUT) demodulated at the tuner 21 is supplied to the earphone via the earphone terminal 15.

The liquid-crystal display section 5 is composed of a DD (Display Driver) 23 and an LCD (Liquid Crystal Display) 24, as shown in FIG. 3. The DD23 is a display driving section for driving the LCD 24 to display the image on the basis of the image signal taken in by the camera section 6 or the video signal received by the TV tuner section 4. More specifically, the DD23 converts the supplied video signal into an analog video signal (analog RGB signal) of a specific number of bits for 220×279 pixels and outputs the converted signal to the LCD 24. The LCD 24 is made up of a color liquid-crystal display unit having a liquid-crystal panel (not shown). In the LCD 24 of this embodiment, a compact flat fluorescent tube (not shown) is used as a backlight (back illumination).

The camera section 6 is composed of a lens 25, a CCD 26, and an ADC 27. The lens 25 is an optical lens formed of glass or plastic, provided on the body 2 of the portable television receiver 1. The CCD 26 generates an electric signal on the basis of the intensity of light focused by the lens 25, and supplies the generated electric signal (analog signal) to the ADC 27. The ADC 27 converts the video signal (analog signal) from the CCD 26 into a signal (digital signal) that can be processed in the image compressing section 9.

The modulating section 7 is composed of a buffer memory 28 and a data modulating circuit 29. The buffer memory 28 temporarily stores the compressed image data to be modulated at the data modulating circuit 29. The data modulating circuit 29 acts as a modulator which converts the digital signal held in the buffer memory 28 into a transmission signal (analog signal) that can be transmitted through a communication channel (in this case, an analog telephone ordinary subscriber's line). The data transfer speed of the data modulating circuit 29 in the first embodiment is set at 1200 bps because the image data is transmitted in sound using an analog-telephone ordinary subscriber's line.

Figure 4:
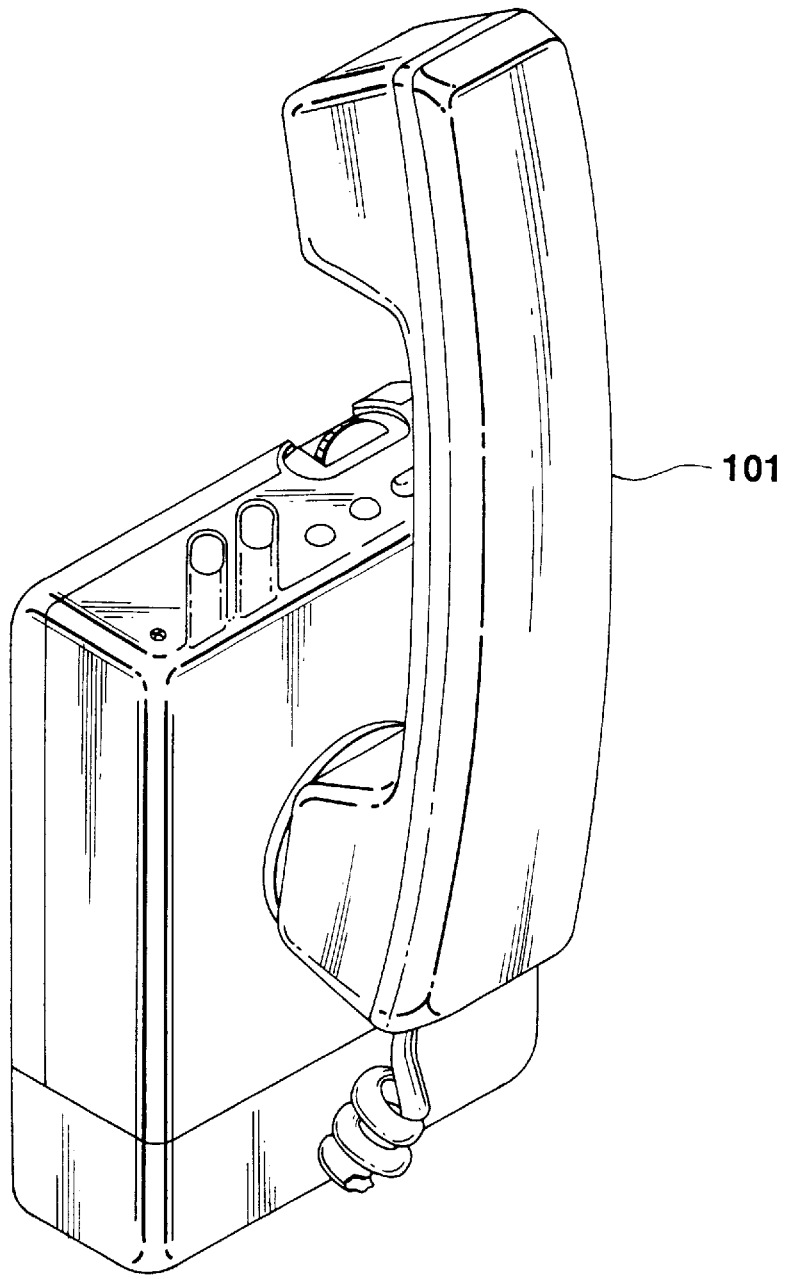
FIG. 4 is a perspective view for explaining how to operate the portable television receiver of the first embodiment.

The speaker section 8 is such that, for example, as shown in FIG. 4, sound data is supplied to the mouthpiece through the speaker holes 8b (see FIG. 2) made inside the noise-isolating wall 8a by pressing the noise-isolating wall 8a provided on the receiver body 2 against the mouthpiece of the handset 101 of a telephone. The noise-isolating wall 8a is formed of an elastic material such as synthetic rubber.

The image compressing section 9 comprises a buffer memory 30, a data compressing circuit 31, a video memory (VRAM) 32, and a DAC (Digital to Analog Converter: D/A converter) 33. The buffer memory 30 temporarily stores the image data that has undergone data compression at the data compressing circuit 31. The image data stored in compressed form in the buffer memory 30 is supplied to the modulating section 7 under the control of a CPU 35. The data compressing circuit 31 performs a compressing (encoding) process on the image data stored in the video memory 32 by a particular encoding method. Specifically, each 8×8 pixel block is compressed by the DCT (Discrete Cosine Transform), quantization, and Huffman coding techniques, using, e.g., a JPEG (Joint Photographic (Coding) Experts Group) algorithm, depending on the type of images to be handled (in this case, still images). This circuit then supplies the compressed image data to the buffer memory 30, which stores it. In this case, the data compressing circuit 31 has the capability of converting the image data to be transmitted in the form of a color video signal for 110×160 pixels in up to 4096 colors (12 bits) into a YC signal consisting of a luminance signal (hereinafter, referred to as signal Y) corresponding to 220×279 pixels and a color signal (hereinafter, referred to as signal C) corresponding to 4096 colors. The above-mentioned 12 bits of digital image data for 220×279 pixels is converted into 12 bits of image data for 110×160 pixels. The compression factor of the compressed image data to be transferred is determined to be nearly $7/100$ (nearly $68/1000$) in consideration of the picture quality after compression and expansion. The video memory 32 is composed of a VRAM (Video RAM), which is a semiconductor image memory for storing the original image data (digital data) to be compressed at the data compressing circuit 31. The DAC 33 converts the video signal (digital signal) of the image data stored in the video memory 32 into a signal (analog signal) that can be displayed on the liquid-crystal display section 5, and outputs the converted signal. In the first embodiment, because an analog data driver is used for the driver for the aforementioned LCD 24 to provide multi-gradation representation, the DAC (D/A converter) is required. However, when a digital data driver is used as the data driver for the liquid-crystal display section 5, the DAC 33 is not required.

The control section 10 comprises a CPU (Central Processing Unit) 34, a RAM (Random Access Memory) 35, and a ROM (Read Only Memory) 36. The CPU 34 supplies various control signals via the bus B to the individual circuits in the portable television receiver 1. The CPU 34 also outputs the compressed image data supplied via bus B from the image compressing section 9 to the modulating section 7 via bus B. The RAM 35 is a semiconductor memory for storing the program data used in a programmed process executed at the CPU 34, the compressed image and sound data, etc. The ROM 36 is a semiconductor memory for storing programs and data used in the portable television receiver 1. The key operation section 10a is composed of various operation switches including the video switch 16, the video-mode select switch 17, and the image taking-in switch 18. When a key switch is pressed, the process corresponding to the key switch is executed by the CPU 34. The bus B is a common signal path to which the modulating section 7, the image compressing section 9, the control section 10, and the key operation section 10a are connected separately, and is made up of an address bus for specifying an address and a data bus for transferring data.

The image data dealt with in the first embodiment is the color image data one screen of which has 110×160 pixels in 4096 colors (12 bits). The amount of image data for one screen comes to 110×279×12=211200 bits (approximately 25.8 kilobytes). This is simultaneously compressed at a ratio of approximately 68/1000 by the image compressing process into 14400 bits of image data. These 14400 bits are transferred in units of 1200 bits per second, and consequently still images are transferred intermittently at a rate of one frame in 12 seconds (=14400÷1200). Therefore, the amount of data actually transferred in a second is 17600 bits (approximately 2.15 kilobytes) of image data obtained by dividing 211200 by 12. These 17600 bits of image data is compressed at a ratio of approximately 68/1000 into an video code including 1200 bits of image data.

Generally, liquid-crystal display units are much thinner than such image display means as CRTs and are easy to make more compact and lighter. Because active matrix LCDs provide minute half-tone control, assure a high contrast ratio, and achieve a high response speed, as compared with simple matrix LCDs, the former are effective devices in the fields requiring multi-gradation color of high picture quality. Particularly, TFT active matrix LCDs with three terminals provide as high a picture quality as that of CRTs.

In the first embodiment, to make more use of the features of the liquid-crystal display unit, a flat fluorescent tube is used as a backlight, thereby making the unit more compact.

Next, an operation of the first embodiment of the present invention will be described hereinbelow.

An operation of the control section 10 in FIG. 3 will be explained first. The program corresponding to the processing effected by the CPU 34 in the control section 10 is stored in the ROM 36 in the same control section 10. The portable television receiver 1 of the first embodiment has a mode (the television mode) in which the TV tuner section 4 receives a television broadcast and the received broadcast is displayed on the liquid-crystal display section 5 (i.e., in this mode, the portable television receiver 1 acts as a television set) and a mode (the camera mode) in which the image data is taken in from the camera section 6.

In the television mode, by turning on the power switch 11 and operating the tuning button 13, the wave from the desired television station is tuned in and the televised image is displayed on the liquid-crystal display section 5, as well as the sound is provided through an earphone connected to the earphone terminal 15. The volume of the earphone is adjusted to the optimum level with the volume control dial 14. When the user wants to listen to only the sound in receiving a TV broadcast, he or she can turn off the televised image on the liquid-crystal display section 5 by pressing the video switch 16. The image data corresponding to the televised image is supplied to the video memory 32 via the ADC 22.

To specify the camera mode, the video-mode select switch 17 is pressed. By doing this, the image data from the camera section 6 is displayed on the LCD 24 of the liquid-crystal display section 5 (the video through image). With either mode specified, to record the image appearing on the LCD 24, the image taking-in switch 18 is pressed. By doing this, the video signal received at the TV tuner section 4 in the television mode or the image data taken in from the camera section 6 in the camera mode is converted into digital data and then stored in the video memory 32. The image data stored in the video memory 32 is compressed at the data compressing circuit 31 and then stored in the buffer memory 30.

To specify the transmission mode, the video-mode select switch 17 is pressed again. Then, the image data already stored in the memory is selected. As shown in FIG. 4, by pressing the noise-isolating wall 8a formed on the back of the receiver body 2 against the mouthpiece of the handset 101 of the telephone now in a busy state, the speaker section 8 is made ready to output the sound data. In this state, when the image taking-in switch 18 is pressed, the compressed image data stored in the buffer memory 30 is outputted to bus B under the control of the CPU 34. A header (identifier) in a specified format is added to the compressed image data and then temporarily stored in the buffer memory 28 in the modulating section 7 via bus B. Next, the data modulating circuit 29 reads the compressed image data from the buffer memory 28 sequentially, and modulates the read-out compressed image data. The modulated compressed image data is outputted in the form of sound data, which is transmitted through a communication channel (in this case, an analog ordinary subscriber's line) to the other party.

On the other hand, the image data (digital data) written in the video memory 32 is D/A converted by the DAC 33, and the converted data is supplied to the DD 23. The DD 23 displays the image data on the LCD 24. Each time the video-mode select switch 17 is pressed, the televised image, the image of the subject from the camera section 6, and the image stored in the memory are displayed one after another in that order. When the operator wants to record the image on the calling party side (the image to be transmitted) appearing on the LCD 24 during telephone conversation, he or she presses the image taking-in switch 18. This causes the image data stored in the buffer memory 30 to be stored in the RAM 35. In this case, as explained in the aforementioned transmission process, the amount of image data for a compressed single screen is approximately 25.8 kilobytes. Therefore, if the image data storage area of the RAM 35 has a capacity of 256 kilobytes, it can store nearly 10 screens of image data. When during communication, the state of the communication channel deteriorates and the picture quality transmitted worsens seriously, the transmission of the image data may be stopped automatically.

As has been described above, with the first embodiment, high-quality images are transmitted through an analog ordinary subscriber's line by transferring a screen of image data (211200 bits) displayed on the LCD 24 at a rate of one screen in 12 seconds, conforming to the data transfer speed (1200 bps) of the compressed image data transmitted through the communication channel. Specifically, because the screen size of the LCD 24 is 1.4 inches and its single screen has 110×160 pixels×12 bits (4096 colors)=211200 bits of data, the image data is transferred at a rate of one frame in 12 seconds. However, as the number of pixels and the number of colors (the number of gradations) in one screen increase or decrease as a result of the change of the screen size, the time required to transfer a single screen of image data is changed. Specifically, for example, it is assumed that a mode in which the image data is transferred in 4096 colors is determined to be a normal mode, and a mode in which representation is made in 65536 colors (16 bits) using the same number of pixels (110×160 pixels) is determined to be a high-quality mode. When the image data is transferred in the high-quality mode, the amount of image data for one screen is 110×160×16=281600 bits (approximately 34.4 kilobytes), which is compressed by the image compressing process at a ratio of approximately 68/1000 into 19200 bits of image data. Still images are transferred at a rate of one frame during the time obtained by dividing these 19200 bits by the number of bits (1200 bits) transmittable in a second (that is, 19200÷1200=16 seconds).

Conventional television receivers are generally manufactured on the assumption that they are installed in a room. Therefore, once they are installed in a place, it is not easy to move them to another place where the user wants to watch a TV program. With the first embodiment, since the picture quality of recent liquid-crystal display units has improved much, a color TFT liquid-crystal display unit is used for the display section in place of a conventional CRT, thereby reducing the power consumption and making the receiver more compact and lighter. In this case, using a small flat fluorescent tube for a backlight in the liquid-crystal unit enables the LCD 24 to be much thinner, thereby making the unit compact and light remarkably. By providing a composite video input/output terminal or an analog/digital RGB input/output terminal as a video input terminal for the ADC 22 that outputs the input signal from the tuner 21 to the video memory 32, the receiver can be connected to video equipment including a video cassette recorder (VCR) and a laser disc player (LDP) or to a computer. For instance, connecting a video cassette recorder with a video output terminal to the receiver enables video images to be displayed on the liquid-crystal display section 5.

The compression method of image data is not limited to the JPEG algorithm in this embodiment. For instance, a block coding method, a predictive coding method, and an orthogonal transform coding method may be used to compress the image data.

Figure 5:
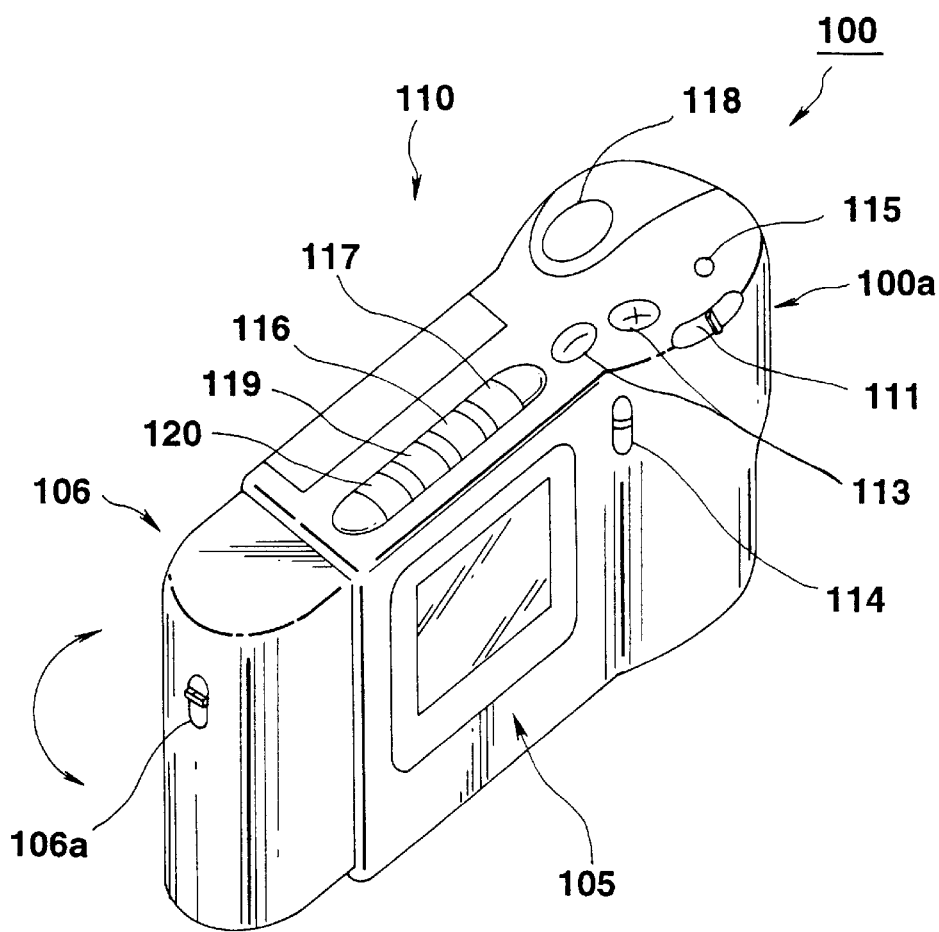
FIG. 5 is a perspective view of a portable television receiver according to a second embodiment of the present invention, taken from the back.
Figure 6:
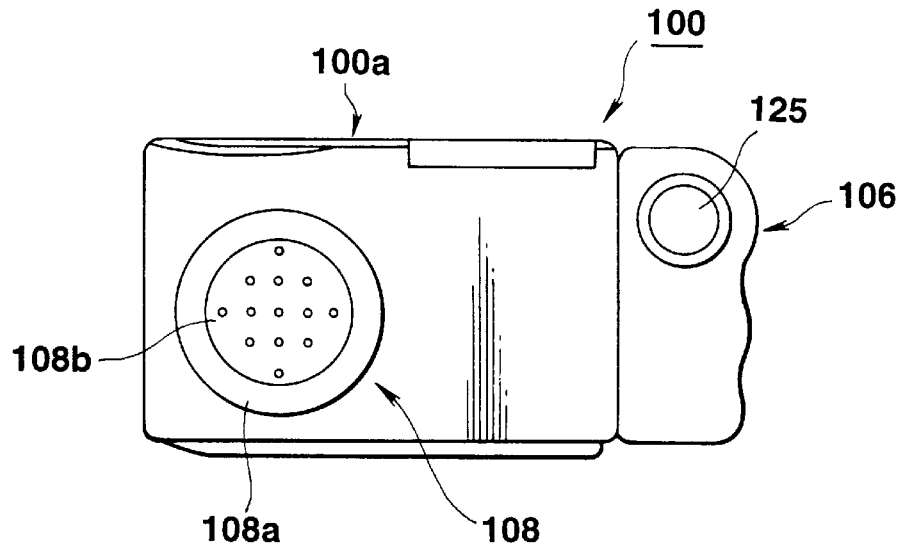
FIG. 6 is a perspective view of a portable television receiver according to a second embodiment of the present invention, taken from the front.

With reference to FIGS. 5 and 6, a portable television receiver according to a second embodiment of the present invention will be explained hereinafter.

FIGS. 5 and 6 are perspective views of a portable television receiver of the second embodiment, taken from the back and the front, respectively. While in the first embodiment, the camera section 6 is fixed, it may be mounted movably, thereby making it possible to transmit a wider subject image. Specifically, a portable television receiver 100 in FIGS. 5 and 6 is provided with a lightweight electronic camera. Its enclosure 100a is formed into a laterally long, narrow, thin rectangular parallelepiped. The enclosure 100a contains a tuner section and a liquid-crystal display section 105 that displays the video signal demodulated at the tuner section, both sections constituting the television receiver. It also contains an earphone terminal 115 for outputting the audio signal demodulated at the tuner section. Inserting an earphone serving as a wire antenna into the earphone terminal 115 enables the user to listen to the sound as well as to receive the televised signal. On the front of the enclosure 100a, there is provided a speaker section 108 which compresses the image during image transmission, modulates the compressed image into an audio signal, and outputs the audio signal. The speaker section 108 is composed of a noise-isolating wall 108a formed on the front of the enclosure 100a and speaker holes 108b made inside the noise-isolating wall 108a. The speaker section is pressed against the mouthpiece of a telephone 101 to output the sound data.

On the right of the enclosure 100a, a camera section 106 for taking a picture of the subject is installed on the enclosure 100a so as to be rotatable in the direction of the arrow in FIG. 5. The camera section 106 has a lens 125 on the front and a lens select switch 106a for switching between the standard lens and the macro lens on the side. The image taken by the camera section 106 is recorded in a recording section which can record a plurality of images. The images taken by the camera section 106 or the image recorded in the recording section is displayed on the liquid-crystal display section 105.

On the back of the enclosure 100a, there is provided the liquid-crystal display section 105. On the top of the enclosure 100a, there is provided a key input section 110. The key input section 110 comprises a power switch 111, a plus/minus key 113, a function key 114, a display key 116, a mode key 117, a shutter button 118, a zoom key 119 and a self-timer key 120. The power switch 111 is used to supply power to the portable television receiver. The plus/minus key 113 is used to control the volume in the television mode by combining tuning selection with the function key 114 (only the plus/minus key 113 during tuning, and the function key 114+the plus/minus key 113 during volume adjustment). It is also used to specify a location in the recording section in which the taken image is to be recorded in the camera recording mode, and to determine which image stored in the recording section to be displayed on the liquid-crystal display section 105 in the camera playback mode. The display key 116 is used to determine whether or not the image is displayed on the liquid-crystal display section 105. The user presses this key when he or she wants to reproduce only the sound in the television mode. The mode key 117 is used to select one of these modes: the television mode in which a television broadcast is displayed on the liquid-crystal display section 105, the camera recording mode in which the image of the subject is taken by the camera section 106, the camera playback mode in which the image recorded in the camera recording mode is played back to display the reproduced image on the liquid-crystal display section 105, and the transmission mode in which the image data is modulated into an audio signal and this audio signal is sent to a telephone line. The shutter button 118 is used to select the image to be transmitted in the television mode or the camera playback mode (the selected image is recorded as the transmission image in a particular recording section), specify recording in the camera recording mode, and specify the transmission of the image in the transmission mode. The zoom key 119 is used to zoom in and out on (enlarge and reduce) the image of the subject by moving the lens of the camera section 106 along the optical axis in the camera recording mode. The self-timer key 120 is used to delay shutter timing for a specified period of time. When the specified period of time has elapsed after the key was pressed, the shutter is pressed automatically. Because the camera section 106 is made rotatable, it is possible to take a picture of a wider subject, and consequently a wider image (subject image) can be transmitted.

On the reception side, after the transmitted compressed image data has been demodulated, the demodulated data is recorded in a recording unit or is decoded to reproduce the image data. For example, when a sensing section for sensing from the identifier in the header added to the compressed image data transmitted during ordinary telephone conversation that the transmitted signal is image data, and a control section for demodulating the image data and then recording the demodulated data in the recording section when the sensing section has sensed that the transmitted data is image data, are provided as a receiving unit for the telephone, the image data can be received. By decoding (expanding) the image data and outputting it on the display section (of the television receiver), the received image data can be seen. By outputting the image data to a computer, the image data can be processed on the computer.

The receiver unit is not limited to the above-described one. For instance, the image data modulated into the audio signal received by an ordinary telephone may be converted by an acoustic coupler into digital data, which is then supplied to another unit (such as a computer). In this case, the transmission side tells the reception side that the former is going to transmit the image data. According to this, the reception side sets an acoustic coupler on the telephone receiver. Then, the image data modulated into the audio signal starts to be transmitted from the transmission side.

With reference to FIGS. 7 to 10, a portable television receiver according to the third embodiment of the present invention will be explained hereinafter.

First, an arrangement of the third embodiment of the present invention will be described hereinbelow.

Figure 7:
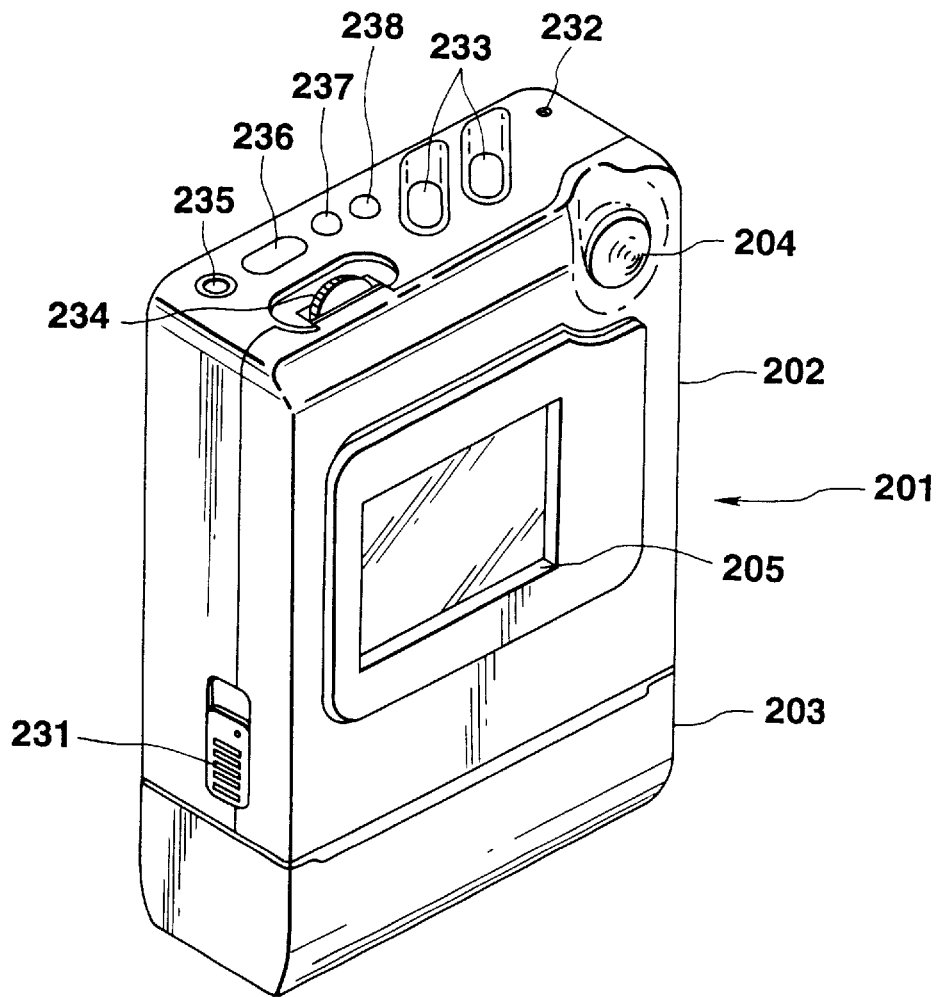
FIG. 7 is a perspective view of a portable television receiver according to a third embodiment of the present invention, viewed from the front.
Figure 8:
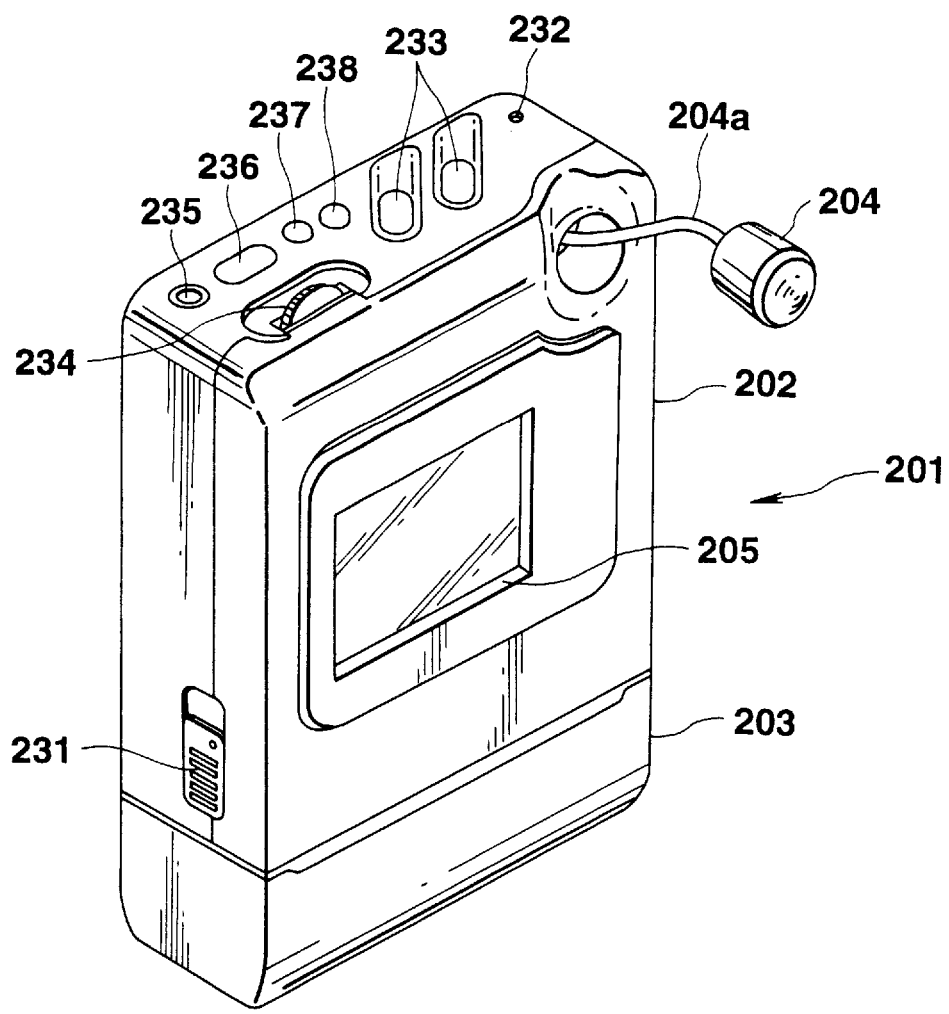
FIG. 8 is a perspective view of the portable television receiver of the third embodiment with the camera section removed.

FIG. 7 shows an outward appearance of the portable television receiver of the third embodiment, and FIG. 8 is a view of the portable television receiver with the camera section removed in FIG. 7. Hereinafter, a case where an analog-telephone ordinary subscriber's line is used as a communication channel will be described. In FIG. 7, the portable television receiver 201 is basically composed of a receiver body 202 and a modem pack 203. The receiver body 202 is made up of a reinforced plastic enclosure. A camera section 204 and a liquid-crystal display section 205 are integrally formed with the enclosure. The modem pack 203 contains a power supply section and a modulation/demodulation circuit, both described later. When the modem pack 203 is attached to the bottom of the receiver body 202, the power supply section supplies a specified current to each circuit in the body 202 and modem pack 203, and the modulation/demodulation circuit which modulates and demodulates particular data. The camera section 204, as shown in FIG. 8, is a compact CCD (Charge Coupled Device) camera installed detachably on the same plane as the screen of the liquid-crystal display section 205. The camera section 204 is connected to the receiver body 202 with a video cable 204a. The liquid-crystal display section 205 is a TFT active matrix liquid-crystal display unit having a 1.4-inch screen size. This display section is provided with a high-resolution color liquid-crystal display panel having 220×279=61380 pixels, where each set of pixels corresponding to R (Red), G (Green), and B (Blue) known as primary colors is arranged in a delta. The receiver body 202 is further provided with various switches: they include a power switch 231, a power indicator 232, a tuning button 233, a volume control dial 234, an earphone terminal 235, video input/output terminal T (FIG. 9), a video transmission switch 236, a video-mode select switch 237, and an image taking-in switch 238. The power switch 231 is used to determine whether or not the voltage supplied from the power-supply section 207 is applied to the portable television receiver 201. The power indicator 232 is made up of LEDs (Light Emitting Diodes) and lights up when the power switch 231 is on. The tuning button 233 is used to increase or decrease the tuning frequency. The volume control dial 234 is used to control the earphone volume. The earphone terminal 235 is a terminal for connecting to an earphone also serving as a wire antenna, and acts as an antenna terminal. The video transmission switch 236 is a switch for specifying facsimile transmission. The video-mode select switch 237 is a switch for choosing one as the image to be transmitted among the image from the camera section 204, the image from the television tuner section 209, and the image data from the video input/output terminal T. The image taking-in switch 238 is a switch used to store the image appearing on the liquid-crystal display section 205 into a particular memory as the image data.

Figure 9:
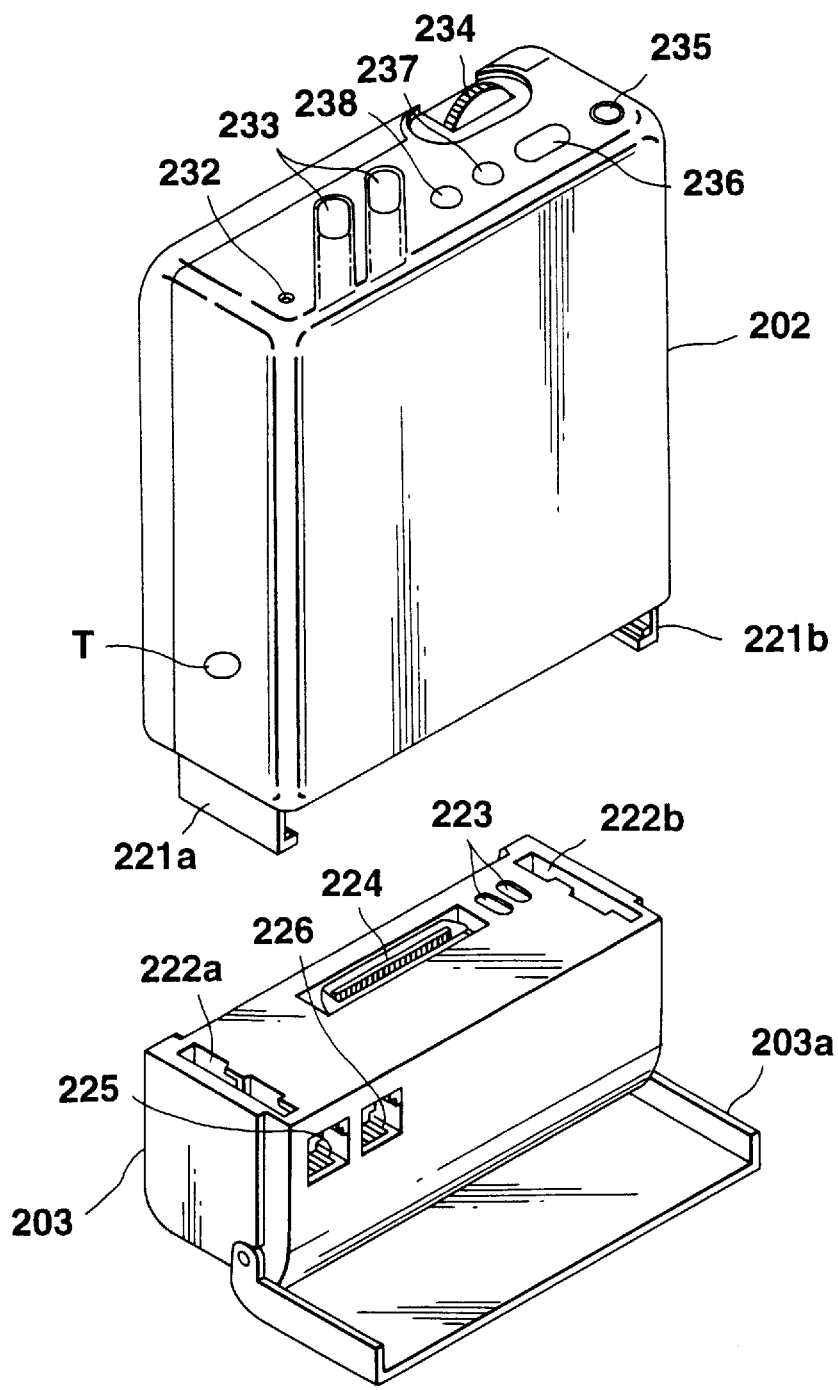
FIG. 9 is a perspective view of the portable television receiver according to the third embodiment, viewed from the back.

FIG. 9 is a rear view of the portable television receiver 201 of the third embodiment shown in FIG. 7. In FIG. 9, engaging recesses 222a and 222b, which engage with engaging claws 221a and 221b provided on the body 202, are formed in the modem pack of the third embodiment. In the modem pack 203, electrodes for supplying power and a connector 224 for supplying signals are also formed. When a cover pivotally formed at its back is uncovered, the modem pack 203 further has a modular jack-type LINE-side input/output terminal 225 to be connected to an analog telephone ordinary subscriber's line and a modular jack-type TEL-side input/output terminal 226 to be connected to a ordinary telephone. The power supply section 207 is contained in the modem pack 203. When attached to the bottom of the receiver body 202, the power supply section 207 supplies a specified current via the electrodes 223 to the individual circuits in the body 202 and the modem pack 203. Specifically, it contains dedicated nickel-cadmium (Ni—Cd) batteries. While in third embodiment, an example of containing dedicated nickel-cadmium batteries is used as the power supply section 207, the present invention is not limited to this example. For instance, the power-supply section 207 may contain a plurality of size AAA alkaline batteries, or be of the AC adapter type where a commercial alternating-current (AC) power supply is converted into a direct-current (DC) voltage before use, or of the car adapter type where a DC battery in the cigarette lighter of a car is used. The video input/output terminal T is connected to an external device and used to input and output image data.

Figure 10:
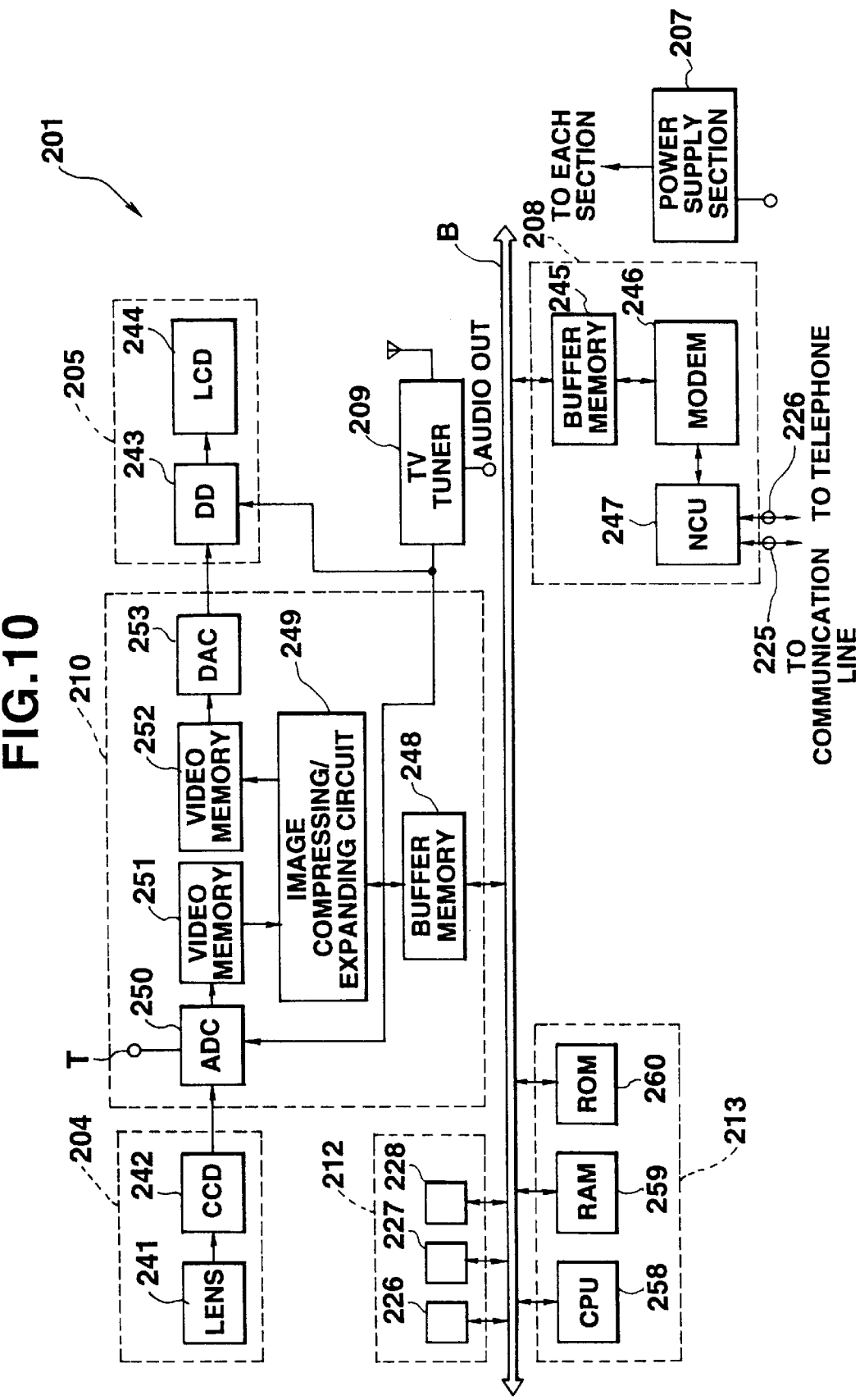
FIG. 10 is a block diagram of the primary portion of the portable television receiver of the third embodiment.

FIG. 10 is a schematic block diagram of the portable television receiver 201 shown in FIG. 7. In FIG. 10, the portable television receiver 201 comprises the camera section 204, the liquid-crystal display section 205, a microphone section 206, the power supply section 207, the modulation/demodulation section 208, the television tuner 209, an image processing section 210, a sound processing section 211, a key operation section 212, and a control section 213. The modulation/demodulation section 208, the image processing section 210, the sound processing section 211, the key operation section 212, and the control section 213 are each connected to a bus B.

The camera section 204 is composed of a lens 241 and a CCD 242. The lens 241 is an optical lens formed of glass or plastic, provided on the body 202 of the portable television receiver 201. The CCD 242 generates an electric signal on the basis of the intensity of light focused by the lens 241, and supplies the generated electric signal (analog signal) to the image processing circuit 210.

The liquid-crystal display section 205 is made up of a DD (Display Driver) 243 and an LCD (Liquid Crystal Display) 244. The DD 243 drives the LCD 244 to display an image on the basis of the video signal from the image processing section 210, that from the television tuner section 209, or that from the video input/output terminal T. Specifically, it converts the supplied video signal into an analog video signal (analog RGB signal) of a specific number of bits for 220×379 pixels and supplies the converted signal to the LCD 244. The LCD 244 is made up of a color liquid-crystal display unit having a liquid-crystal panel 269 explained later. In the LCD 244 of the third embodiment, a compact flat fluorescent tube 275, explained later, is used as a backlight (back illumination).

The power supply section 207 is composed of nickel-cadmium batteries contained in the modem pack 203, as mentioned earlier. When the power switch 231 is turned on, the power supply section supplies a specified voltage to each circuit in the receiver body 202 and the modem pack 203.

The modulation/demodulation section 208 is composed of a buffer memory 245, a modem 246, and an NCU 247. The modulation/demodulation section 208 is a modem (Modulation and DEModulation) 246 contained in the modem pack 203 as the power supply section 207. The modem 246 modulates the image data taken in by the camera section 204 via the LINE-side input/output terminal 225 for transmission and demodulates the received image data. The buffer memory 245 temporarily stores the image data demodulated by the modem 246 or the image data sequentially read by a CPU 258 to be modulated. The image data stored in the buffer memory 245 is supplied to the bus B during demodulation and to the modem 246 during modulation, under the control of the CPU 258. The modem 246 and the NCU 247, as mentioned above, modulate the image data taken in by the camera section 204 via the LINE-side input/output terminal 225 for transmission, and demodulates the received image data. The modem 246 and NCU 247 in the third embodiment can perform signal transfer at a rate of 14400 bps, the maximum data transfer speed available on the analog telephone ordinary subscriber's line. Therefore, they can perform G3-mode FAX transmission.

The television tuner 209 selectively receives a particular TV wave and outputs the received analog video signal to a ADC 250 of the image processing circuit 210 or the DD 243 of the liquid-crystal display section 205. The tuner also outputs the demodulated audio signal (AUDIO OUT) to the earphone terminal 235.

The image processing section 210 comprises a buffer memory 248, an image compressing/expanding circuit 249, an ADC (Analog to Digital Converter: A/D converter) 250, video memories (VRAM) 251 and 252, and a DAC (Digital to Analog Converter: D/A converter) 253. T indicates a video input/output terminal. The buffer memory 248 temporarily stores the compressed image data encoded at the image compressing/expanding circuit 249 or the compressed image data supplied via bus B. The image data stored in compressed formed in the buffer memory 248 is read sequentially under the control of the CPU 258. Giving the buffer memory 248 a sufficient memory capacity makes it possible to store more than one set of the image data taken in by the camera section 204 in compressed form. This enables the portable television receiver 201 to be used as an electronic still camera. The image compressing/expanding circuit 249 performs a binarization process on the image data stored in the video memory 251, and executes a compression process (an encoding process) on the binarized image data by a particular encoding method such as the MH (Modified Huffman), MR (Modified Relative element address designate), or MMR encoding method. The ADC 250 converts the image signal (analog signal) from the camera section 204 or the TV image signal (analog signal) from the television tuner 209 into a signal (digital signal) that can be processed in the image processing section 210, and outputs the converted signal to the video memory 251. The video memories 251 and 252 are composed of VRAMs (Video RAMS). The video memory 251 is a semiconductor image memory for storing the image data (digital data) supplied from the ADC 250. The video memory 252 is a semiconductor image memory for storing the image data compressed or expanded at the image compressing/expanding circuit 249. The DAC 253 converts the video signal (digital signal) of the image data stored in the video memory 252 into a signal (analog signal) that can be displayed on the liquid-crystal display section 205, and outputs the converted signal. In the third embodiment, because an analog display driver is used for the display driver for the aforementioned LCD 244, the DAC (D/A converter) is required. However, when a digital display driver is used as the display driver, the DAC 253 is not required.

The key operation section 212 is composed of various operation switches including the video transmission switch 236, the video-mode select switch 237, and the image taking-in switch 238. When a key switch is pressed, the process corresponding to the key switch is executed by the CPU 258.

The control section 213 comprises a CPU (Central Processing Unit) 258, a RAM (Random Access Memory) 259, and a ROM (Read Only Memory) 260. The CPU 258 supplies various control signals via bus B to the individual circuits in the receiver body 202 and the modem pack 203, and executes a communication program according to the type of communication channel connected. Further, when the image data transmitted from the other party's image transmitting unit (FAX terminal) is received and the modulation/demodulation section 208 demodulates it and outputs to the CPU 258, the CPU 258 then outputs the modulated compressed image data to the buffer memory 248 in the image processing section 210 via bus B. The CPU 258 also outputs the compressed image data supplied from the image compressing/expanding circuit 249 via the buffer memory 248 to bus B, to the modulation/demodulation section 208. The RAM 259 is a semiconductor memory for storing the program data used in a programmed process executed at the CPU 258, the compressed image data, etc. The ROM 260 is a semiconductor memory for storing programs and data used in the portable television receiver 201.

The bus B is a common signal path to which the modulation/demodulation section 208, the image processing section 210, the key operation section 212, and the control section 213 are connected separately, and is made up of an address bus for specifying an address and a data bus for transferring data.

With the above-described configuration, liquid-crystal display units are generally very thin as compared with such image display means as CRTs and are easy to make more compact and lighter. Because active matrix LCDs provide minute half-tone control, assure a high contrast ratio, and achieve a high response speed, as compared with simple matrix LCDs, the former are effective devices in the fields requiring multi-gradation color representation of high picture quality. Particularly, TFT active matrix LCDs with three terminals provide as high a picture quality as that of CRTs.

In the third embodiment, to make more use of the features of the liquid-crystal display unit, efforts have been made to render the backlight more compact.

Figure 11:
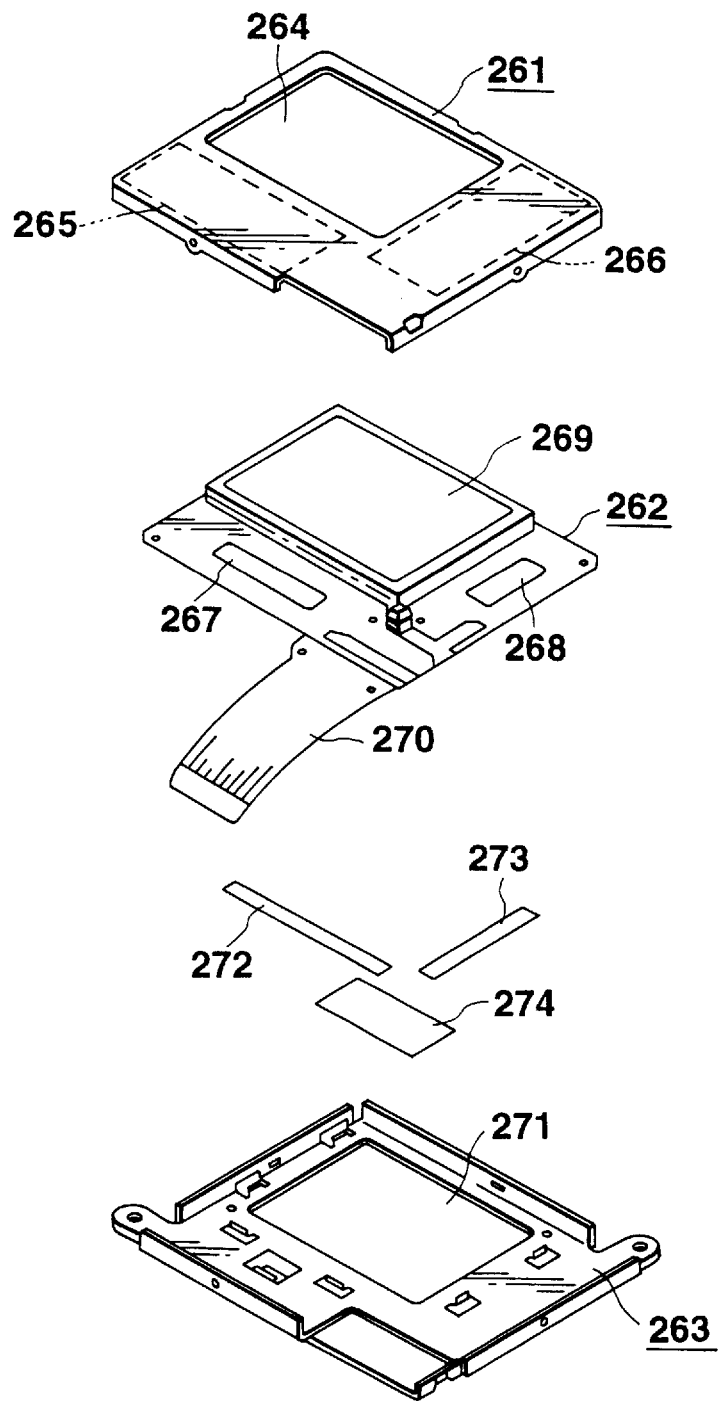
FIG. 11 is an exploded perspective view of an LCD.

FIG. 11 is an exploded perspective view of the LCD 244 in FIG. 10. In FIG. 11, the LCD 244 is composed of a front shield case 261, a liquid-crystal display unit 262, and a back shield case 263. The front shield case 261, as shown in FIG. 11, has a screen opening 264 in it. Insulating tapes 265 and 266 are put on the back of the front shield case 261. The liquid-crystal display unit 262 comprises a scanning driver circuit 267, a data driver circuit 268, and a liquid-crystal panel 269, and are formed by TAB (Tape Automated Bonding) techniques. Numeral 270 indicates a flexible substrate provided with signal lines for outputting the necessary signals to the scanning driver circuit 267 and the data driver circuit 268. The scanning driver circuit 267 drives a scanning bus (not shown) in the liquid-crystal panel 269, controls the on and off of a single line of TFT in the scanning direction, and applies the voltage at the data bus (not shown) to the liquid-crystal cells for the necessary period of time with specific timing. The data driver circuit 268 drives the data bus of the liquid-crystal panel 269 on the basis of the image data input. The liquid-crystal panel 269 is a TFT liquid-crystal display panel of the active matrix type. For instance, the analog video signal of a specific number of bits for 220×279 pixels, which is supplied from the image compressing/expanding circuit 249 and then D/A converted at the DAC 253 via the video memory 252, is converted by the DD 233 into an analog RGB signal of a specific number of bits with 220×279 pixels, which is displayed on the screen of the LCD 244 with 220×279 pixels. The back shield case 263, as shown in FIG. 11, has a backlight opening 271 in it, and is stuck to the liquid-crystal display unit 262 with double-sided tapes 272, 273, and 274.

Figure 12:
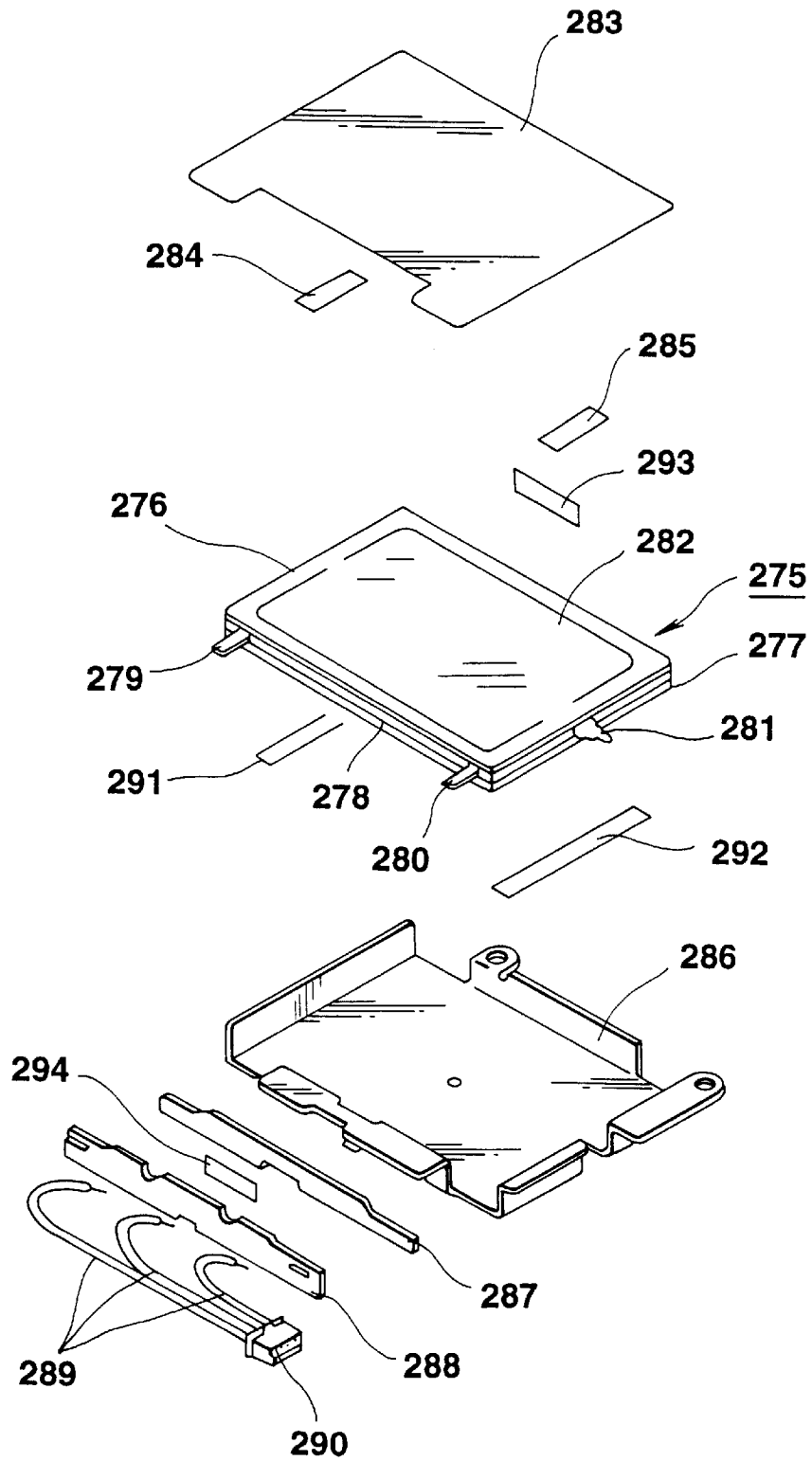
FIG. 12 is an exploded perspective view of a flat fluorescent tube.

FIG. 12 is an exploded view of the flat fluorescent tube 275 in FIG. 10. In the flat fluorescent tube 275, argon (Ar) gas and mercury (Hg) are sealed in a container composed of a front glass panel 276, a back glass panel 277, and a frame glass 278. Also in the tube, a pair of discharging electrodes (not shown) having a U- or V-shaped hollow cathode structure are placed so as to face each other on both sides. A fluorescent substance is applied to the inside faces of the front glass panel 276 and the back glass panel 277 by screen-stencilling. There are provided lead strips 279 and 280 extending downwards in accordance with the discharging electrodes on the right and left sides. Numeral 281 indicates an evacuate tube and 282 represents a fluorescent surface. The flat fluorescent tube 275 is stacked on the back of the LCD 244. With this arrangement, light is projected from the entire area of the fluorescent surface 282 onto the aforementioned backlight opening 271. A transparent thin resin sheet 283 is stuck to the front glass panel 276 with the double-sided tapes 284 and 285 so as to leave small space between the sheet 283 and the fluorescent surface 282. The resin sheet 283 is formed of a polyethylene terephthalate (PET) mixed with an ultraviolet ray-screening agent, and has excellent heat resistance and the capability of cutting off ultraviolet rays. The ultraviolet ray-shielding agent may be applied instead of being mixed. On the back of the flat fluorescent tube 275, a shield case 286 is provided. The shield case 286 cuts off electromagnetic waves generated at the flat fluorescent tube 275 and prevents an adverse effect on the peripheral circuits. Numeral 287 indicates a spacer, 288 a substrate, 289 leads and 290 a connector. The shield case 286 is stuck to the back glass panel 277 with the double-sided tapes 291 and 292, thereby mounting the flat fluorescent tube 275 to which the insulating tape 293 is stuck. On the bottom of the shield case 286, the substrate 288 is provided via the spacer 287. The substrate 288 and the leads 289 are connected to each other by soldering the lead strips 279 and 280 and leads 289 to the substrate 288. The leads 289 are further connected to the connector 290. Specifically, the spacer 287 is sandwiched between the shield case 286 and the substrate 288, serves as a seat in installing the substrate 288 by sticking it with the double-sided tape 294, prevents the passing through of the light emitted from the flat fluorescent tube 275, and assures the absolute distance against a high voltage between the shield case 286 and the substrate 288. As described above, the flat fluorescent tube 275 is placed very close to the back of the liquid-crystal display unit 262. Namely, the shield case 286 of the flat fluorescent tube 275 is forced to adhere to the back of the back shield case 263 of the liquid-crystal display unit 262.

To cause the flat fluorescent tube 275 to emit light, a high voltage is required. Because of this, the voltages at the lead strips 279 and 280 of the tube 275 and at the substrate 288 to which these strips are connected are high. As the lead strips 279 and 280 of the tube 275 and the substrate 288 come closer to the back shield case 263 of the liquid-crystal display unit 262, the high voltage difference can cause discharges, which permits current to flow, thus destroying the inside of the liquid-crystal display unit 262. To overcome this problem, the resin sheet 283 covering the fluorescent surface 282 and the lead strips 279 and 280 are provided on the front of the flat fluorescent tube 275. This prevents a hand from touching the lead strips 279 and 280. The arrangement can also insulate the lead strips 279 and 280 and the substrate 288 from the back shield case 263 of the liquid-crystal display unit 262 to prevent discharges from occurring between them. Since the flat fluorescent tube 275 generates ultraviolet rays, using it directly as a backlight permits the liquid-crystal to deteriorate due to ultraviolet rays. In this embodiment, however, because the resin sheet 283 contains an ultraviolet-shielding agent, the liquid-crystal can be protected from ultraviolet rays.

As the surface of the fluorescent tube 275 has a more uniform temperature distribution, the tube emits light more stably because of its electrical characteristic. To make use of this, the resin sheet 283 with excellent heat resistance is stuck so as to leave a small space between itself and the fluorescent surface 282, thereby achieving a heat-retention effect to keep the air layer warm making use of the radiant heat from the tube. In the assembly in the factory, if the fluorescent surface of the flat fluorescent tube 275 is damaged, the defect causes diffused reflection, permitting the defect to appear as a shade on the liquid-crystal screen. However, use of the resin sheet 283 prevents the fluorescent surface from being damaged.

Next, an operation of the third embodiment of the present invention will now be described hereinbelow.

An operation of the control section 213 of FIG. 10 will be described first. The program corresponding to the processing of the CPU 258 in the control section 213 is stored in the ROM 260 of the same control section 213. A case where the portable television receiver 201 is always connected to a telephone line will be explained hereinafter. In practical use, only the body 201 of the portable television receiver may be used as a portable camera to take a picture of outdoor scenery and, as required, be connected to a telephone line to output the image data. In the portable television receiver 201 of the third embodiment, when the receiver 201 is in the power-off state, the LINE-side input/output terminal 225 and the TEL-side input/output terminal 226 in the modem pack 203 are connected to each other. In this state, the sound signal from the telephone is supplied directly from the TEL-side input/output terminal 226 via the LINE-side input/output terminal 225 to an analog telephone ordinary subscriber's line. On the other hand, the sound signal from an analog telephone ordinary subscriber's line is supplied directly from the LINE-side input/output terminal 225 via the TEL-side input/output terminal 226 to the telephone. When the portable television receiver 201 is in the power-on state, the LINE-side input/output terminal 225 and the TEL-side input/output terminal 226 in the modem pack 203 are disconnected from each other.

The portable television receiver 201 of the third embodiment is provided with a first operation mode (during power off) in which the receiver is used as an ordinary telephone, a second operation mode (during power on) in which the receiver is used as a facsimile machine, and a third operation mode (during power on and the television mode selected by the video-mode select switch 237) in which the receiver is used as a television receiver. Operations in the first operation mode (i.e., the audio data transmission/reception mode), the second operation mode (i.e., the video data transmission/reception mode) and in the third operation mode (i.e., the television mode) of the third embodiment will be described hereinafter.

(First operation mode)

A particular number is dialed on the telephone to establish a connection to the other party's terminal through a communication channel according to specified procedure, and then a telephone conversation is started. Specifically, the analog audio data from the transmitter (not shown) of the telephone connected to the TEL-side input/output terminal 226 is outputted directly to the communication channel via the NCU 247. The analog audio data from the communication channel is outputted directly to the receiver (not shown) of the telephone connected to the TEL-side input/output terminal 226 via the NCU 247. This enables a telephone conversation (audio data communication) with the other party's terminal. The communication is terminated by an on-hook operation and the line is disconnected.

(Second operation mode)

The image data taken by the camera section 204 at the time of image data transmission is A/D converted by the ADC 250. In response to the trigger signal from the CPU 258, a screen of image data from the ADC 250 is stored in the video memory 251. The image data stored in the video memory 251 undergoes a binarization process explained later and a compression process (encoding) at the image compressing/expanding circuit 249. The resulting data is temporarily stored in the buffer memory 248. The image data stored in compressed form in the buffer memory 248 is read sequentially according to the control signal from the CPU 258. During communication through the telephone line, or when a picture of outdoor scenery taken by the camera section 204 with the body of the portable television receiver 201 detached is displayed on the LCD 244 and the displayed image (transmission image) is required to be recorded, the image data in the buffer memory 248 is stored in the RAM 259 by the operator pressing the image taking-in switch 238. Then, the FAX number of the other party's terminal is dialed on the telephone (not shown), the communication channel is connected according to specified procedure. After this, the compressed image data read from the CPU 258 is modulated by the modem 246, and the modulated data is outputted from the LINE-side input/output terminal 225 via the NCU 247, thereby establishing a facsimile communication. In image data reception, at the request of the other party's terminal for facsimile communication, the communication channel is connected according to specified procedure. The image data inputted at the LINE-side input/output terminal 225 is supplied to the model 246 via the NCU 247. The compressed data demodulated at the modem 246 is temporarily stored in the buffer memory 245. The compressed image data stored in the buffer memory 245 is read sequentially according to the control signal from the CPU 258 and then stored in the RAM 259. At the same time, the data is supplied via the buffer memory 248 to the image compressing/expanding circuit 249. The data subjected to an expansion process (decoding) at the image compressing/expanding circuit 249 is supplied via the video memory 252 to the LCD 244 of the display section 205, which then displays the received image data.

Figure 13:
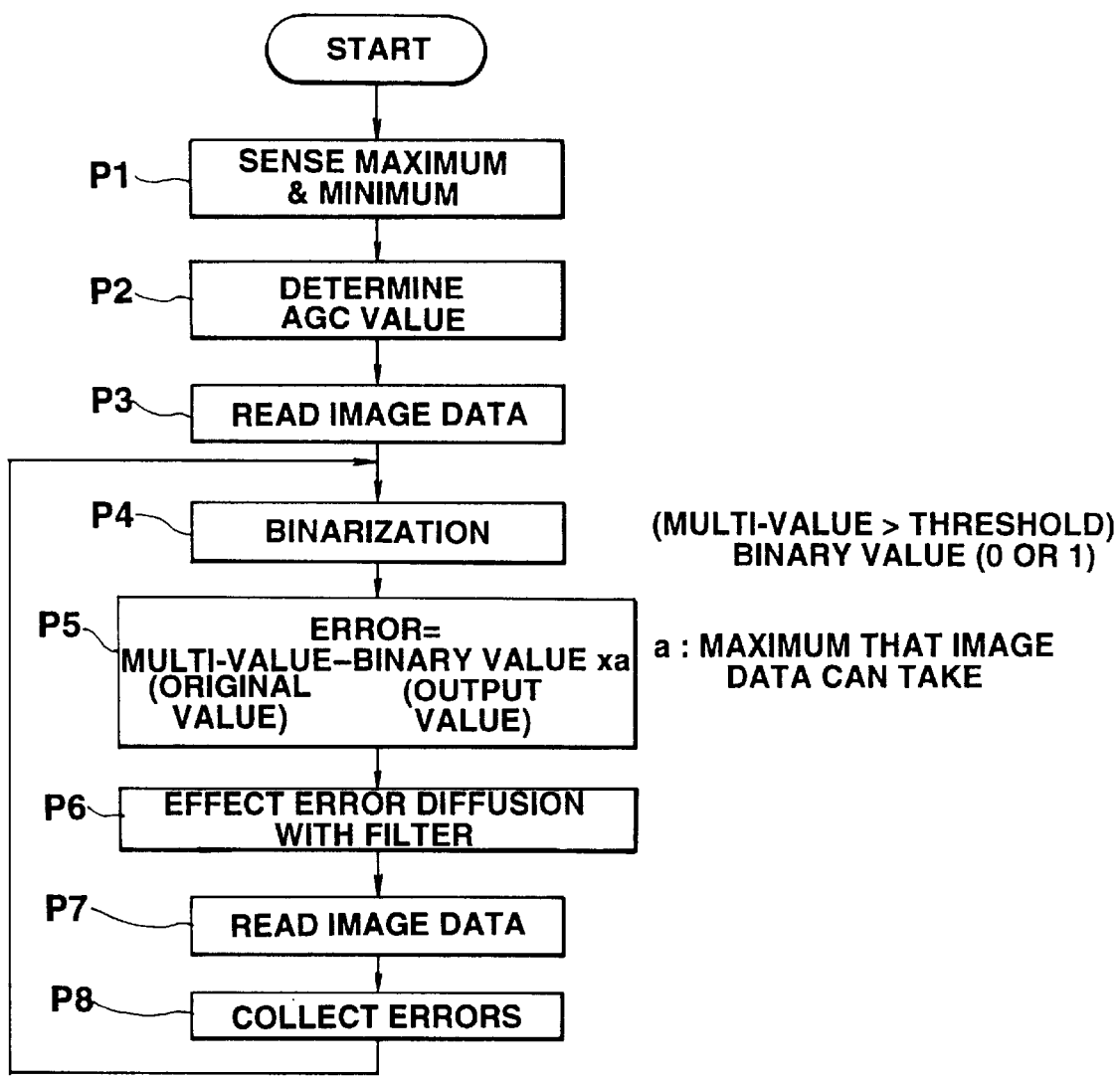
FIG. 13 is a flowchart for a binarization process.
Figure 14:
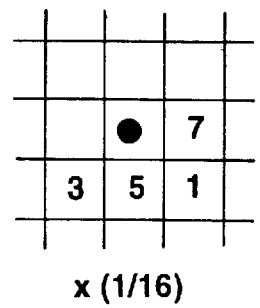
FIG. 14 is a diagram for explaining an error diffusion process at a filter in the binarization process.

With reference to FIGS. 13 and 14, the binarization process used in the second operation mode will be described in detail hereinafter.

FIG. 13 is a flowchart of the binarization process and FIG. 14 is an explanatory diagram for an error diffusion process at a filter in the binarization process of FIG. 13. First, the image compressing/expanding circuit 249 of FIG. 10 senses the maximum and the minimum value of the image data in the video memory 251 (step P1), and determines an automatic gain control value (AGC value) (step P2). At the same time, it reads the image data (pixel data) (step P3). The binarization process is performed by comparing the value of the read-out image data with a threshold value (step P4). The binary value×a (the output value) is subtracted from the multi-value image data (the original data) to obtain an error (error=the multi-value−the binary value×a) (step P5). Here, a is the maximum value that the multi-value image data can take. For instance, in the case of four bits, the maximum value is 7 in the range from 0 to 7. Next, error diffusion is effected by an error diffusion filter (step P6). FIG. 14 shows an example of the error diffusion filter. As shown in the figure, the filter diffuses the error in portion [•] to adjacent places at rates shown in numbers (actually, 1/16 of these values). In other words, it divides the error in portion [•] and assigns them to adjacent places. After the error diffusion process has been effected, the next image data (pixel data) is read (step P7) and then errors are collected. Then, control returns to step P4 and the processes from step P4 to step P8 are executed as described above. The image compressing/expanding circuit 249 performs the predetermined encoding to the image data subjected to the binarization process, and then supplies the encoded image data to bus B via the buffer memory 248. The image data supplied to the image compressing/expanding circuit 249 is not limited to the multi-value image data, but may be the binarized image data. When the binarized image data is supplied, the binarization process is not required to be performed. As described above, the third embodiment enables the portable television receiver 201 not only to function as a telephone but also to perform facsimile transmission.

(Third operation mode)

The video signal received by the television tuner 209 is displayed on the LCD 244 of the liquid-crystal display section 205. At the same time, the audio signal demodulated at the television tuner 209 is outputted at the earphone terminal 235.

With reference to FIGS. 15 to 23, a portable television receiver according to the fourth embodiment of the present invention will be explained hereinafter.

First, an arrangement of the fourth embodiment of the present invention will be described hereinbelow.

Figure 15:
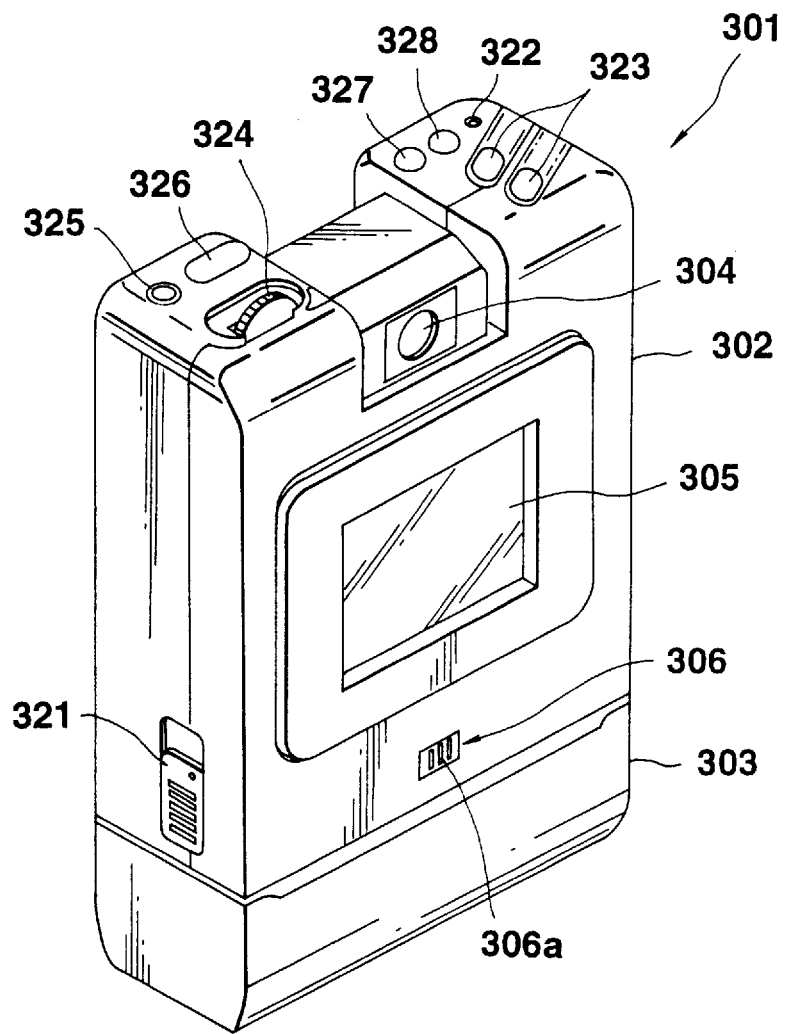
FIG. 15 is a perspective view of a portable television receiver according to a fourth embodiment of the present invention, viewed from the front.
Figure 16:
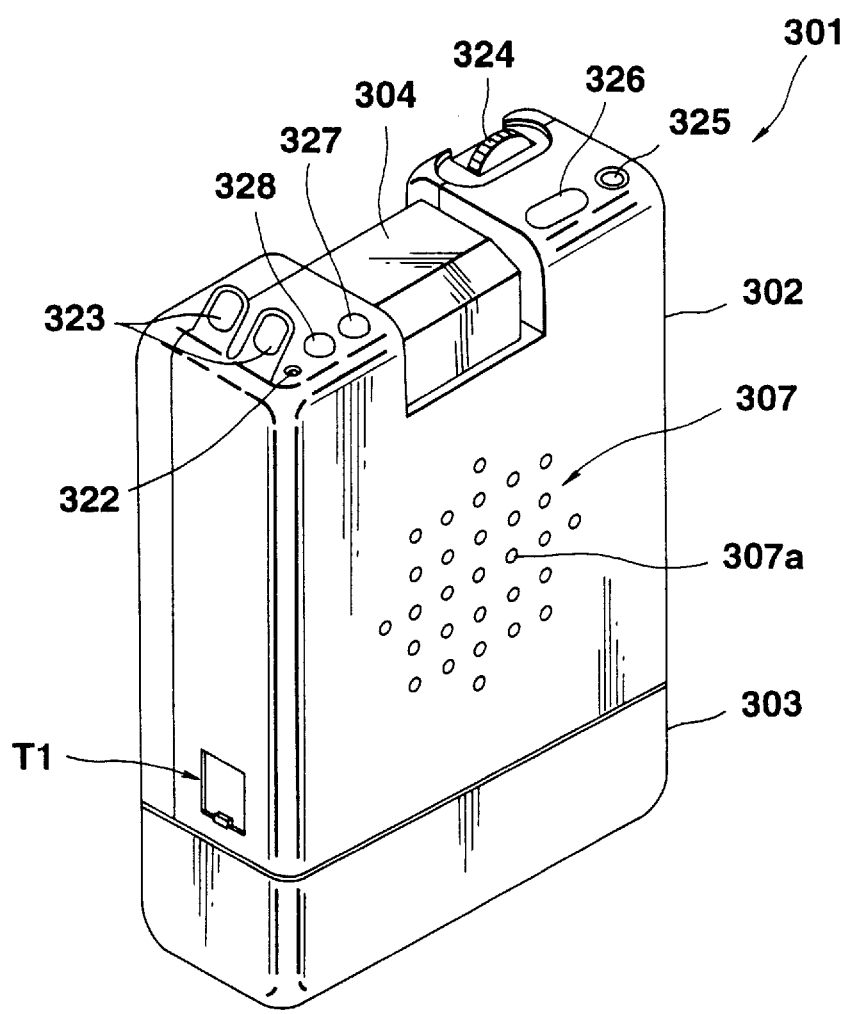
FIG. 16 is a perspective view of the portable television receiver according to the fourth embodiment, viewed from the back.

FIGS. 15 and 16 are perspective views of the portable television receiver 301 of the fourth embodiment, viewed from front and the back, respectively. Hereinafter, a case where an analog-telephone ordinary subscriber's line is used as a communication channel will be described. In FIG. 15, the portable television receiver 301 is basically composed of a receiver body 302 and a power supply section 303. The receiver body 302 is made up of a reinforced plastic enclosure measuring 65 mm in height, 60 mm in width and 24 mm in thickness. On the front of the body 302, a camera section 304, a liquid-crystal display section 305, and a microphone section 306 are integrally provided, as shown in FIG. 15. On the back of the body 302, a speaker section 307 is integrally provided, as shown in FIG. 16.

A power supply section 303, when attached to the bottom of the receiver body 302, supplies a specific current to the body 302. Specifically, the power supply section 303 is made up of a battery pack incorporating dedicated nickel-cadmium (Ni—Cd) batteries. While in this embodiment, explanation is given using a battery pack with built-in dedicated nickel-cadmium batteries as the power-supply section 303 attached to the bottom of the body 302, the invention is not limited to this. For instance, the power-supply section 303 may be composed of a dry-battery pack containing five size AAA alkaline batteries, an AC adapter using a commercial alternating-current (AC) power supply, or a car adapter using a direct-current (DC) battery in the cigarette lighter of a car.

The camera section 304, as shown in FIGS. 15 and 16, is a compact CCD (Charge Coupled Device) camera located in the center of the receiver body 302. The camera section 304 is attached to the body 302 by a rotating shaft (not shown) so as to rotate freely. Specifically, the camera section 304 of this embodiment is supported so as to rotate through an angle of nearly 180° forward and backward from the side of the screen of the liquid-crystal display section 305 (the front of the body 302) to the side of the speaker section 307 on the back of the body 302. This arrangement makes it possible to change the field of vision without changing the position of the body 302.

The liquid-crystal display section 305 is a TFT active matrix liquid-crystal display unit having a 1.4-inch screen size. This display section is provided with a high-resolution color liquid-crystal display panel having 220×279=61380 pixels, where each set of pixels corresponding to R (Red), G (Green), and B (Blue) known as primary colors is arranged in a delta.

The microphone section 306 is made up, e.g., of an electrostatic microphone. As shown in FIG. 15, it receives sound data through microphone holes 306a made in the bottom front of the receiver body 302. While in this embodiment, an electret electrostatic microphone is used for the microphone section 306, the invention is not limited to this. For instance, a microphone for the microphone section 306 may be a dynamic microphone.

The speaker section 307 is composed of, e.g., a dynamic cone-type loudspeaker, and outputs sound data from speaker holes 8b made in the back of the body 302 as shown in FIG. 16. While in this embodiment, explanation is given using a dynamic cone-type loudspeaker as the speaker section 307, the invention is not restricted to this. For instance, a speaker used for the speaker section 307 may be an entire surface-driven-type electrostatic or flat loudspeaker or a dome loudspeaker.

The receiver body 302 is further provided with various operation switches: they include a power switch 321, a power indicator 322, a tuning button 323, a volume control dial 324, an earphone terminal 325, a video switch 326, a video-mode select switch 327, and an image taking-in switch 328. The power switch 321 is used to determine whether or not the voltage supplied from the power-supply section 303 is applied to the portable television receiver 301. The power indicator 322 is made up of LEDs (Light Emitting Diodes) and lights up when the power switch 321 is on. The tuning button 323 is used to increase or decrease the tuning frequency. The volume control dial 324 is used to control the earphone volume. The earphone terminal 325 is a terminal for connecting to an earphone also serving as a wire antenna, and acts as an antenna terminal. The video switch 326 is a switch for instructing the liquid-crystal display section 305 whether to display an image on the LCD screen or not. The video-mode select switch 327 is a switch for choosing between the transmission and the reception screen on the liquid-crystal display section 305. The image taking-in switch 328 is a switch for causing the image displayed on the liquid-crystal display section 305 to be stored as image data in a particular memory.

Figure 17:
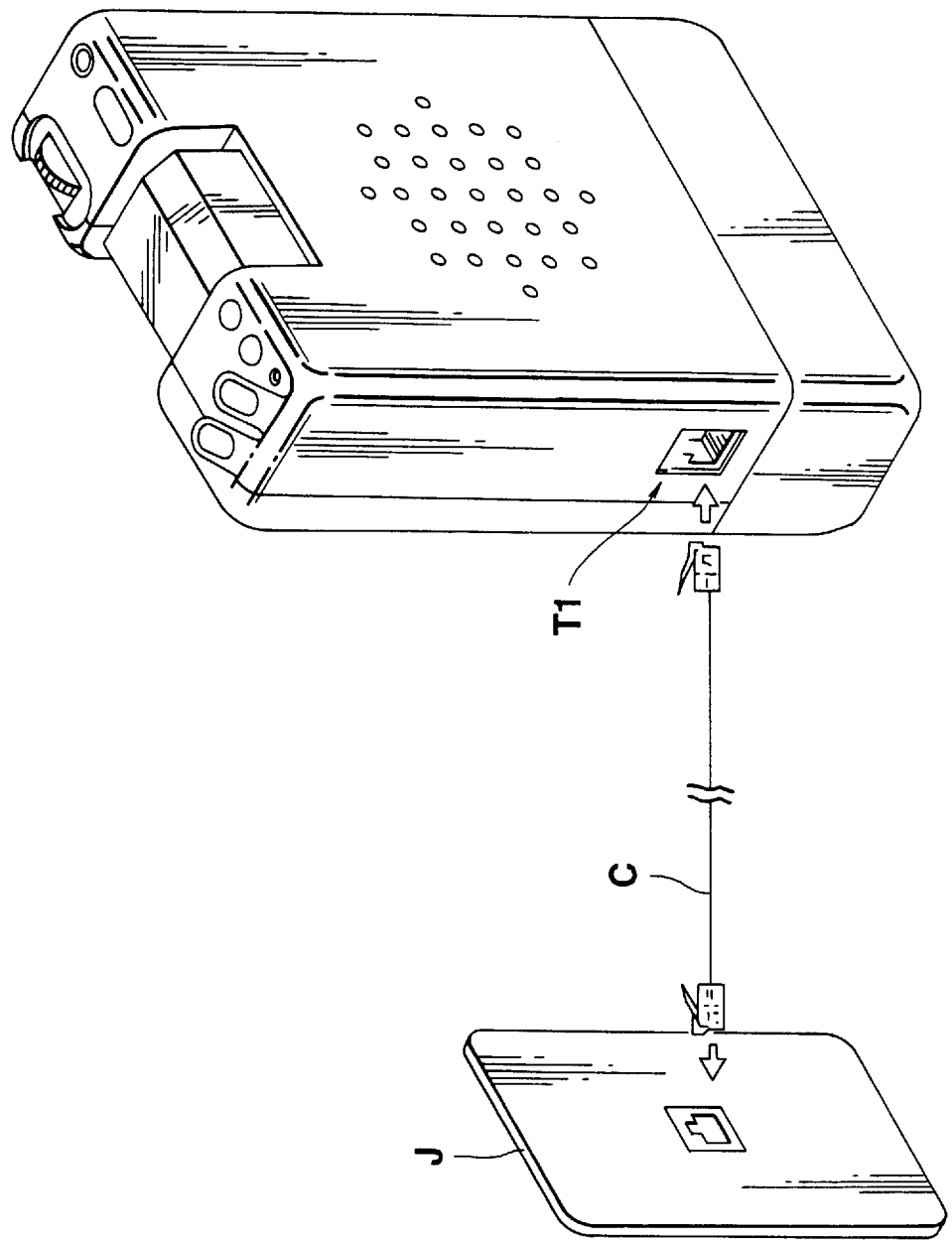
FIG. 17 is a drawing to help explain the connection between the portable television receiver of the fourth embodiment and a telephone line.

FIG. 17 shows how the portable television receiver 301 of FIG. 15 is connected to the communication channel. In FIG. 17, the receiver 301 of the fourth embodiment has an input/output terminal T1 on the side of the body 302. A modular cable C connects the input/output terminal T1 to a modular jack-type outlet J connected to an analog telephone ordinary subscriber's line.

Figure 18:
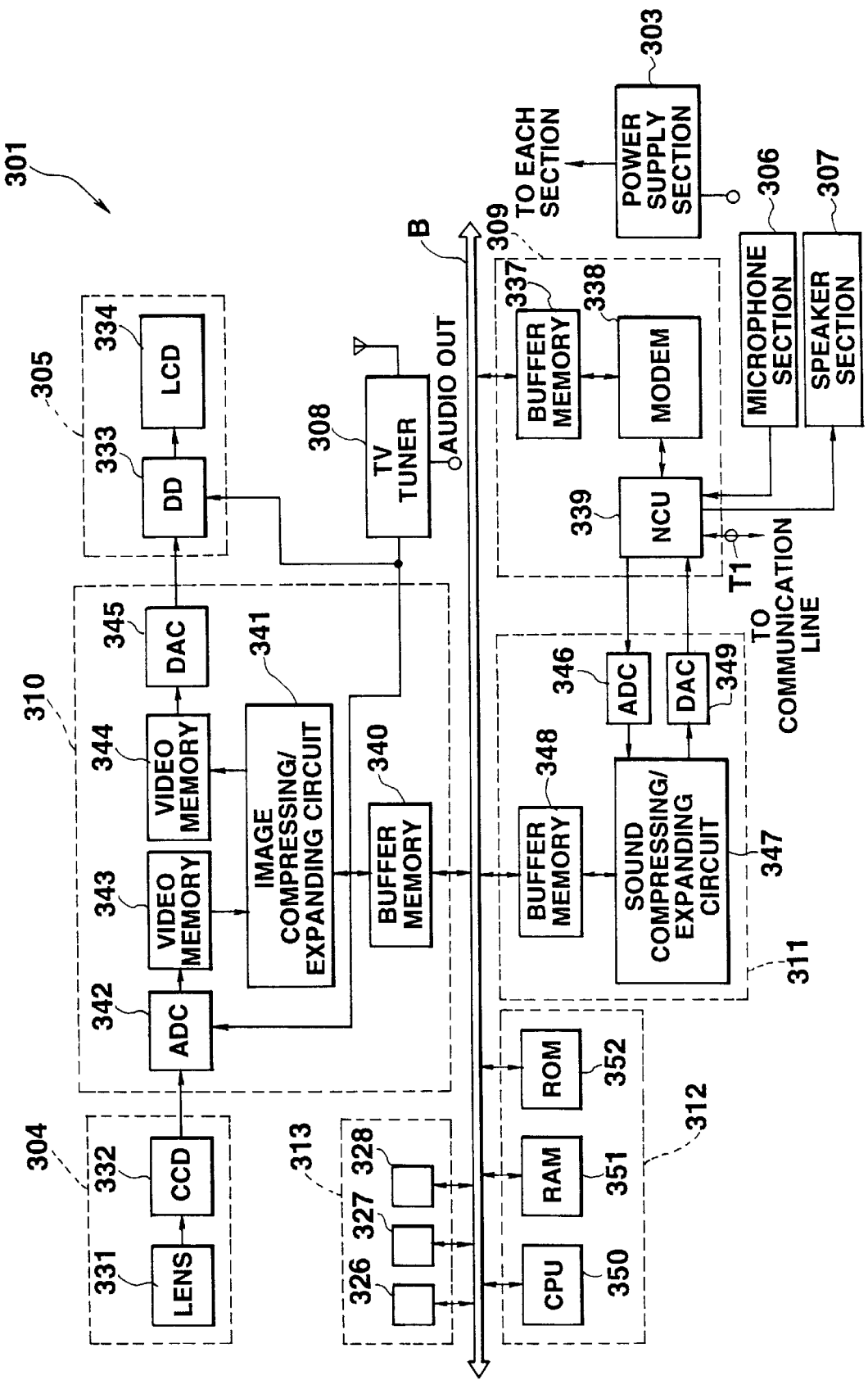
FIG. 18 is a block diagram of the primary portion of the portable television receiver of the fourth embodiment.

FIG. 18 is a schematic block diagram of the portable television receiver 301 shown in FIG. 15. In FIG. 18, the portable television receiver 301 comprises the receiver body 302, the power supply section 303, the camera section 304, the liquid-crystal display section 305, the microphone section 306, the speaker section 307, a television tuner section 308, a modulation/demodulation section 309, an image processing section 310, a sound processing section 311, a control section 312, and a key input section 313. The modulation/demodulation section 309, the image processing section 310, the sound processing section 311, the control section 312, and the key input section 313 are each connected to a bus B.

The power supply section 303 is composed of a battery pack containing nickel-cadmium (Ni—Cd) batteries, as mentioned earlier. The power supply section, when the power switch 321 is turned on, supplies a specified voltage to each section of the receiver body 302.

The camera section 304 is composed of a lens 331 and a CCD 332. The lens 331 is an optical lens formed of glass or plastic, provided on the body 302. The CCD 332 generates an electric signal on the basis of the intensity of light focused by the lens 331, and supplies the generated electric signal (analog signal) to the image processing section 310.

The liquid-crystal display section 305 is composed of a DD (Display Driver) 333 and an LCD (Liquid Crystal Display) 334. The DD 333 drives the LCD 334 to display the image on the basis of the video signal from the image processing section 310. More specifically, the DD 333 converts the supplied video signal into an analog video signal (analog RGB signal) of a specific number of bits for 220×279 pixels and outputs the converted signal to the LCD 334. The LCD 334 is made up of a color liquid-crystal display unit having a liquid-crystal panel 369. In the LCD 334 of the fourth embodiment, a compact flat fluorescent tube 375 is used as a backlight (back illumination).

The microphone section 306 supplies the sound data taken in through the microphone holes 306a to the sound processing section 311 as the sound data to be transmitted.

The speaker section 307 supplies the sound data from the sound processing section 311 through the speaker holes 307a to the outside as the sound data to be received.

The TV tuner section 308 selectively receives a particular TV wave and outputs the video signal to the image processing section 310. The audio signal (AUDIO OUT) demodulated at the television tuner section 308 is supplied to the earphone (not shown) via the earphone terminal 325.

The modulation/demodulation section 309 is composed of a buffer memory 337, a modem (Modulation and DEModulation) 338, and an NCU (Network Control Unit) 339. T1 indicates an input/output terminal for the aforementioned communication channel (in this case, an analog telephone ordinary subscriber's line). The buffer memory 337 temporarily stores the image or sound data demodulated by the modem 338, or the image or sound data multiplexed by the CPU 350. The image or sound data stored in the buffer memory 337 is supplied to bus B during demodulation and to the modem 338 during modulation, under the control of the CPU 350. The modem 338 and the NCU 339 function as a modulator which converts serial digital signals from a computer or a terminal device into a signal (analog signal) that can be transferred through a communication channel and transmits it. They also function as a demodulator which converts the signal (analog signal) transmitted over a communication channel into a digital signal that can be read by a computer or a terminal device. The NCU 339 enables an analog telephone ordinary subscriber's line to be used as a communication channel. The modem 338 and NCU 339 in the fourth embodiment can perform signal transfer at a rate of 14400 bps, the maximum data transfer speed available on the analog telephone ordinary subscriber's line. By incorporating video codes and audio codes in a single frame, serving as a unit of processing, the image data and the sound data are transferred bi-directionally. This enables a screen of image data to be transferred at a rate of one frame in three seconds in the form of intermittent images.

The image processing section 310 comprises a buffer memory 340, an image compressing/expanding circuit 341, an ADC (Analog to Digital Converter: A/D converter) 342, video memories (VRAMs) 343 and 344, and a DAC (Digital to Analog Converter: D/A converter) 345. T2 indicates a video input/output terminal. The buffer memory 340 temporarily stores the compressed image data compressed at the image compressing/expanding circuit 341. The image data stored in compressed formed in the buffer memory 340 is read sequentially under the control of the CPU 350. Giving the buffer memory 340 a sufficient memory capacity makes it possible to store more than one set of the image data taken in by the camera section 304 in compressed form. This enables the portable television receiver 301 to be used as an electronic still camera. The image compressing/expanding circuit 341 performs a compression (encoding) process on the image data stored in the video memory 343 by a particular encoding method. Specifically, each 8×8 pixel block is subjected to the compression process by the DCT (Discrete Cosine Transform), quantization, and Huffman coding techniques, using, e.g., a JPEG (Joint Photographic (Coding) Experts Group) algorithm, depending on the type of images to be handled (in this case, still images). The image compressing/expansion circuit 341 also expands (decodes) the compressed image data received via the communication channel and demodulated at the modulation/demodulation section 309, and then supplies the expanded image data to the video memory 344, which stores it. In this case, the circuit has the capability of converting the image data transmitted as a color video signal for 110×1160 pixels in a maximum of 4096 colors (12 bits) into a YC signal consisting of a luminance signal (hereinafter, referred to as signal Y) corresponding to 220×279 pixels and a color signal (hereinafter, referred to as signal C) corresponding to 4096 colors. The above-mentioned 12 bits of data for 110×160 pixels is converted into 12 bits of digital image data for 220×279 pixels. The data compression factor in the image compression process is determined to be nearly $7/100$ (nearly $68/1000$) in consideration of the picture quality after expansion. The ADC 342 converts the image signal (analog signal) from the camera section 304 or from the television tuner section 308 into a signal (digital signal) that can be processed in the image processing section 310, and outputs the converted signal to the video memory 343. The video memories 343 and 344 are composed of VRAMs (Video RAMS). The video memory 343 is a semiconductor image memory for storing the image data (digital data) supplied from the ADC 342. The video memory 344 is a semiconductor image memory for storing the image data compressed or expanded at the image compressing/expanding circuit 341. The DAC 345 converts the video signal (digital signal) of the image data stored in the video memory 344 into a signal (analog signal) that can be displayed on the liquid-crystal display section 305, and outputs the converted signal. In this embodiment, because an analog display driver is used for the data driver for the aforementioned LCD 334, the DAC (D/A converter) is required. However, when a digital display driver is used as the data driver, the DAC 345 is not required.

The sound processing section 311 comprises an ADC 346, a sound compressing/expanding circuit 347, a buffer memory 348, and a DAC 349. The ADC 346 converts the audio signal (analog signal) supplied from the microphone section 306 via the NCU 339 of the modulation/demodulation section 309 into a signal (digital signal) that can be processed in the sound processing section 311, and outputs the converted signal to the sound compressing/expanding circuit 347. The sound compressing/expanding circuit 347 compresses (encodes) the digital sound data from the ADC 346 by a particular encoding method based on a CELP (Code Excited Linear Prediction) algorithm, using means for analyzing the input data for a certain period of time, means for synthesizing a waveform on the basis of the analyzed parameters, means for computing the difference between the input waveform and the synthesized waveform, etc. The circuit then outputs the compressed sound data to the buffer memory 348. Further, the circuit expands (demodulates) the compressed sound data demodulated at the modulation/demodulation section 309, and outputs the expanded sound data to the DAC 349. The data compression factor in the sound compression process is determined to be nearly $5/100$ (nearly $50/1000$) in consideration of the sound quality after expansion. The buffer memory 348 temporarily stores the sound data subjected to the compression process at the sound compressing/expanding circuit 347 or the compressed sound data to be expanded at the sound compressing/expanding circuit 347. The sound data stored in compressed form in the buffer memory 348 is read sequentially under the control of the CPU 350.

The control section 312 comprises a CPU (Central Processing Unit) 350, a RAM (Random Access Memory) 351, and a ROM (Read Only Memory) 352. The CPU 350 supplies various control signals via bus B to the individual circuits in the receiver 301 and executes a communication control program according to the type of communication channel connected. Further, when the multiplexed image and sound data transmitted from the other party's image transmitting unit (videophone) is received and the modulation/demodulation section 309 demodulates it and outputs to the CPU 350, the CPU 350 then separates the demodulated image and sound data. Then, the CPU 350 outputs the compressed image data to the image compressing/expanding circuit 341 in the image processing section 310 via bus B. It also outputs the compressed sound data to the sound compressing/expanding circuit 347 in the sound processing section 311 via bus B. The CPU 350 also multiplexes the compressed image data outputted from the image compressing/expanding circuit 341 via the buffer memory 340 to bus B with the compressed sound data outputted from the sound compressing/expanding circuit 347 via the buffer memory 348 to bus B. It then outputs the multiplexed data as image and sound data to the modulation/demodulation section 309 via bus B. The RAM 351 is a semiconductor memory for storing the program data used in a program process executed at the CPU 350, the compressed image and sound data, etc. The ROM 352 is a semiconductor memory for storing programs and data used in the receiver 301.

The key input section 313 is composed of various operation key switches: they include the video on/off switch 326, the video-mode select switch 327, and the image taking-in switch 328. When a key switch is pressed, the process corresponding to the key switch is executed by the CPU 350.

The bus B is a common signal path to which the modulation/demodulation section 309, the image processing section 310, the sound processing section 311, the control section 312, and various key switches (326, 327, 328) are connected separately, and is made up of an address bus for specifying an address and a data bus for transferring data.

Figure 19:
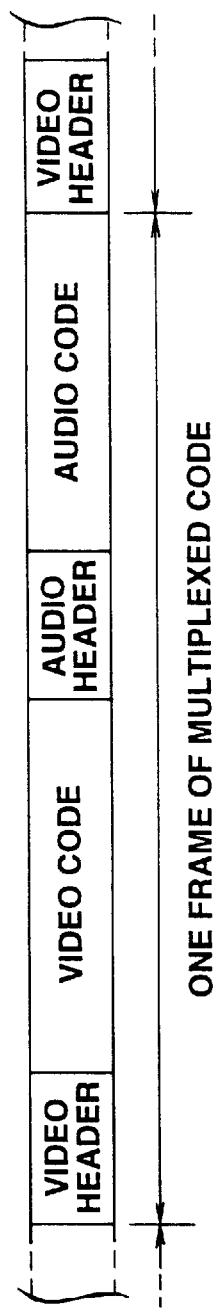
FIG. 19 is a diagram of the format for image and sound in the time division multiplex system.

FIG. 19 shows the structure of a frame of multiplexed code. A frame of multiplexed code is composed of nearly 256 bytes (approximately 2048 bits) of video data consisting of a video header and a video code, and nearly 256 bytes (approximately 2048 bits) of audio data consisting of an audio header and an audio code. A video code and an audio code contain an error correction code each. A video header and an audio header are placed ahead of a video code and an audio code, respectively. The total amount of transferred video and audio data contained in the actual video and audio codes comes to 9600 bps, where 4800 bps are used for video data and another 4800 bps are used for audio data. Specifically, the data length of one frame contains a total of approximately 512 bytes (approximately 4098 bits), where nearly 256 bytes are used for video data and another nearly 256 bytes are used for audio data. At a transfer speed of 14400 bps, the data transfer time for a single frame is approximately 280 ms (it takes nearly 140 ms to transfer a frame of video data and nearly 140 ms to transfer a frame of audio data). Namely, approximately 3.57 frames of data is transferred in a second, which means that the amount of video data transferred in a second comes to nearly 7300 bits (256×8×3.57=7311). Therefore, in this embodiment, the information on the screen size, commands concerning image data transfer, error correction codes, etc. are contained in the approximately 2500 bits of data obtained by subtracting the actual video image data (4800 bps) from the nearly 7300 bits of data transferred in a second.

The image data dealt with in the fourth embodiment is color image data a screen of which has 110×160 pixels in 4096 colors (12 bits). The amount of image data for a single screen comes to 100×279×12=211200 bits (nearly 25.8 kilobytes). This is simultaneously compressed by the image compression process at a ratio of nearly $68/1000$ into 14400 bits of image data. These 14400 bits are transferred at a rate of 4800 bits per second, that is, intermittent still images are transferred at a rate of one frame in three seconds (=14400÷4800). Consequently, the amount of data actually transferred in a second is 70400 bits (approximately 8.6 kilobytes) of image data obtained by dividing 211200 bits by 3. These 70400 bits of image data is compressed at a ratio of nearly $68/1000$ into a video code containing 4800 bits of video data. Instead of simultaneously compressing a screen of image data and transferring the compressed image data, the original data may be divided in advance on the basis of the transferring time and each divided piece of data be compressed one after another. The audio data is sampled at a rate of 12 bits×8 kHz and converted into digital data. These 12×8000= 96000 bits of audio data is compressed at a ratio of nearly $50/1000$ into an audio code containing 4800 bits of audio data.

With the above-described configuration, liquid-crystal display units are generally very thin as compared with such image display means as CRTs and are easy to make more compact and lighter. Because active matrix LCDs provide minute half-tone control, assure a high contrast ratio, and achieve a high response speed, as compared with simple matrix LCDs, the former are effective devices in the fields requiring multi-gradation color representation of high picture quality. Particularly, TFT active matrix LCDs with three terminals provide as high a picture quality as that of CRTs.

Next, an operation of the fourth embodiment of the present invention will be explained hereinbelow.

An operation of the control section 312 of FIG. 18 will be described first. The program corresponding to the processing at the CPU 350 in the control section 312 is stored in the ROM 352 in the same control section 312. The receiver 301 of the fourth embodiment is provided with a first operation mode in which a particular television broadcast is received and displayed on the liquid-crystal display section 305, and a second operation mode in which transmission and reception of the image and sound data are performed via a particular communication channel.

When the receiver 301 is in the power off state, or when it is in the power on state and in the first operation mode, the input/output terminal T1 of the receiver 301 is not connected to the modular jack-type outlet J and the receiver function as an ordinary television receiver.

When the receiver 301 is in the power on state and in the second mode, the image signal taken in by the camera section 304 is converted into a digital signal with the input/output terminal T1 of the portable television receiver 301 connected to the modular jack-type outlet J by means of the modular cable C. The digital signal is supplied to the image compressing/expanding circuit 341 via the video memory 343. The image compressing/expanding circuit 341 converts the input image data into compressed image data through a particular compression process (encoding), and outputs the converted data to the buffer memory 340. The sound signal is taken in by the receiver 301 through the microphone section 306. After the signal is A/D converted by the ADC 346 via the NCU 339, it is then compressed by a particular compression process at the sound compressing/expanding circuit 347. The compressed signal is supplied to the buffer memory 348. According to the control signal from the CPU 350, the compressed sound data in the buffer memory 348 is outputted to bus B. The image and sound signals outputted to bus B are combined by the CPU 350 as shown FIG. 19. This combined signal is modulated by the modem 338 and NCU 339 and the modulated signal is supplied from the input/output terminal T1 to the analog telephone ordinary subscriber's line.

On the other hand, after the input signal supplied from the analog telephone ordinary subscriber's line via the input/output terminal T1 is demodulated at the modem 338 and NCU 339, the demodulated signal is A/D converted by the DSP (Digital Signal Processor) in the modem 338 and the converted signal is supplied to the buffer memory 337. According to the control signal from the CPU 350, the image signal and the sound signal in the buffer memory 337 are supplied to bus B. The image signal and the sound signal outputted to bus B are separated from each other by the CPU 350. The separated image signal is expanded (decoded) by the image compressing/expanding circuit 341 via the buffer memory 340, and the expanded signal is displayed on the LCD 334 of the liquid-crystal display section 305. The sound signal is expanded at the sound compressing/expanding circuit 347. The expanded signal is then D/A converted by the DAC 349, and the converted signal is supplied via the NCU 339 to the speaker section 307.

Figure 20:
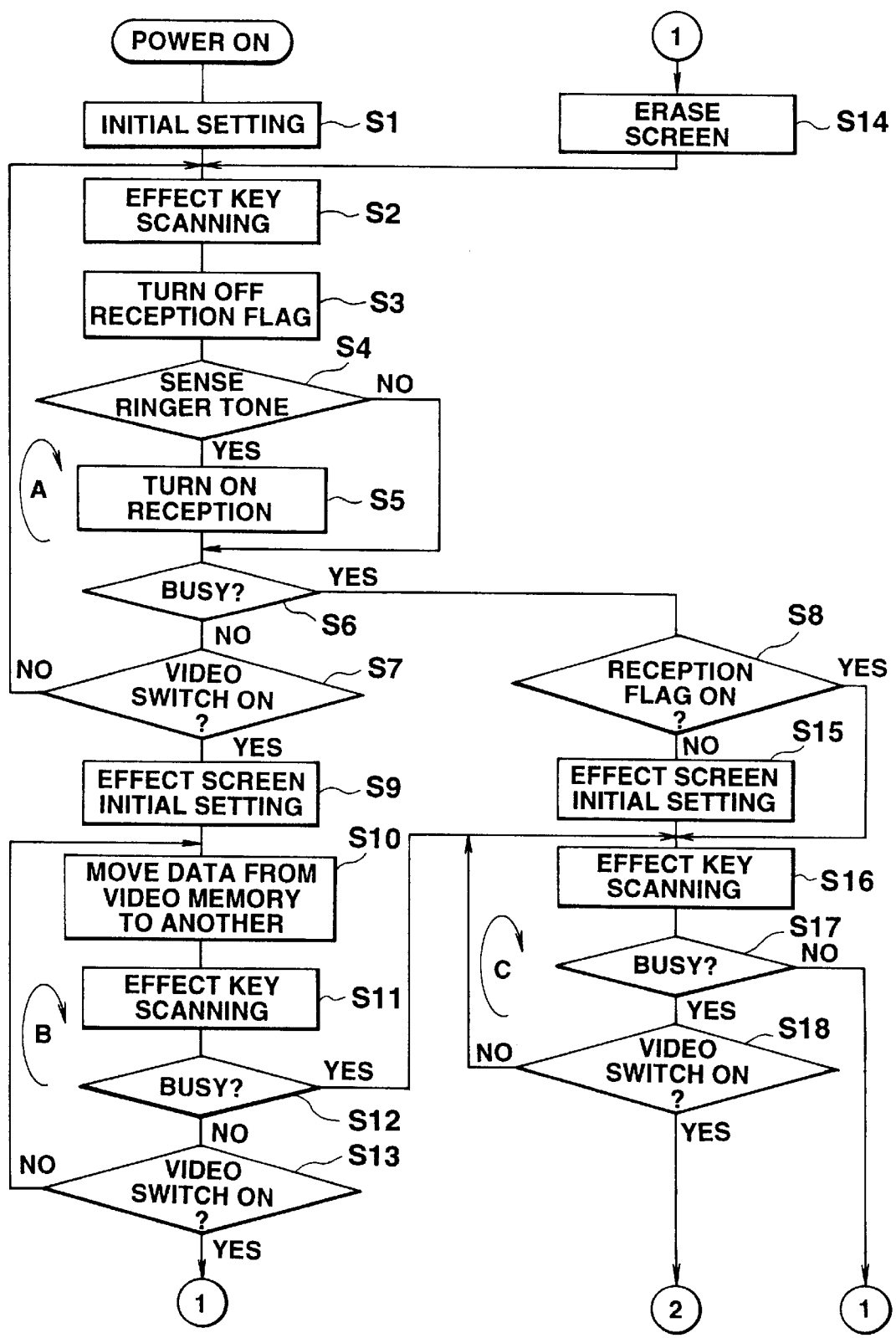
FIG. 20 is a flowchart for the operation of the control section in the portable television receiver of the fourth embodiment.
Figure 21:
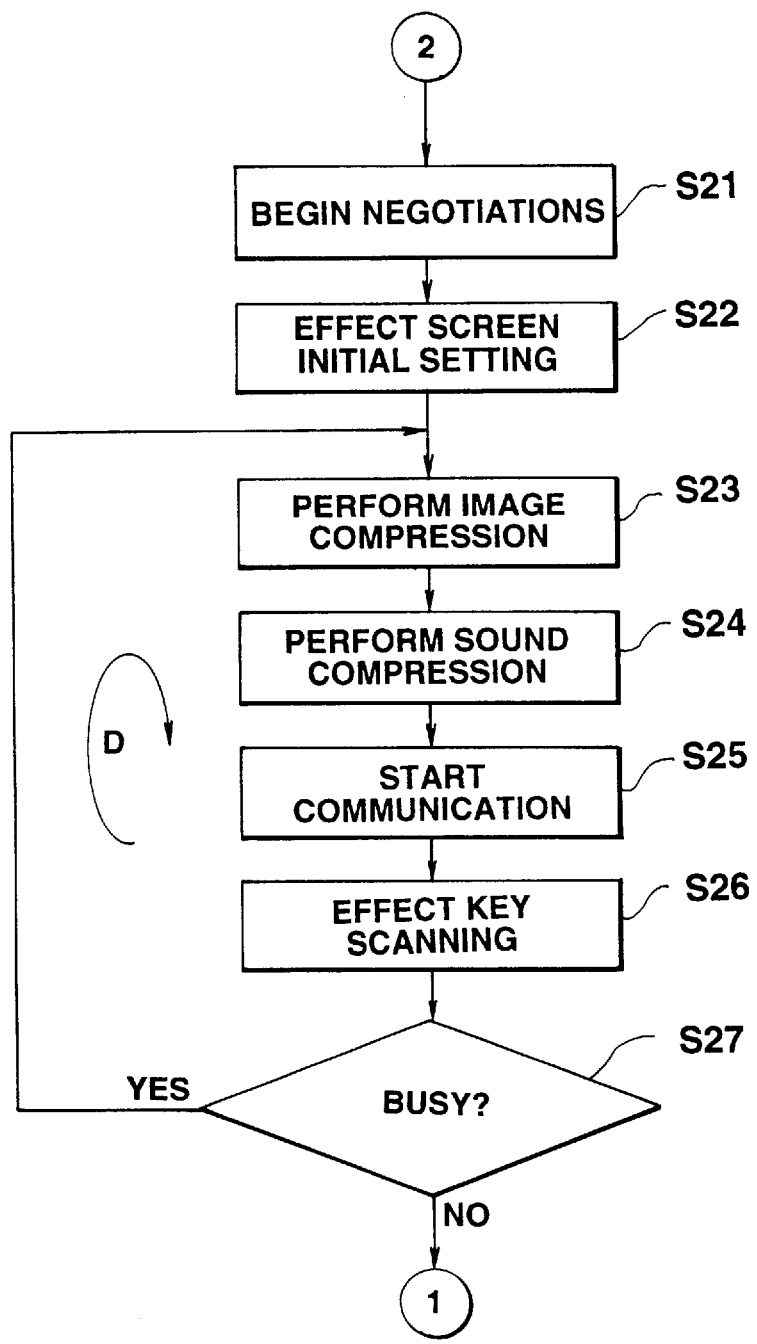
FIG. 21 is a flowchart of the operation of the control section continued from FIG. 20.

FIGS. 20 and 21 are a flowchart for explaining the operation of the CPU 350 when taken together. First, after the power of the receiver 301 is turned on, initial setting (including the initialization of the control section 312 and the clearing of each memory) is effected (step S1), and key scanning is performed to check to see if there has been any input from key switches 326, 327, 328, . . . (step S2). If a key input is present, the necessary process explained later will be executed according to the key operation. Then, the reception flag is turned off once (="0") (step S3), and the line voltage level of the NCU 339 is checked. In this state, a check is made by sensing a ringer tone to see if there has been any call from the other party (step S4). If it is judged that the ringer tone period is on, the reception flag is turned on (="1") (step S5), the line voltage level of the NCU 339 is checked again, and a check is made to see if the line is busy (step S6). If it is judged that the line is not busy now, it will be judged whether or not the video switch 326 has been pressed. If the switch 326 has not been pressed, the processing will be repeated from step S2 (step S7). As a result, a loop A in a condition that the line is not busy and the video on/off switch 326 is not pressed is constituted.

On the other hand, if the video switch 326 is pressed in the process at step S7, the initial setting of the display screen (LCD 334) in the liquid-crystal display section 305 will be effected (step S9). After the initial setting of the LCD 334 is completed, the image data stored in the video memory 343 is read into the image compressing/expanding circuit 341, which supplies it directly to the video memory 344, thereby moving the image data from the video memory 343 to the video memory 344 (step S10). Next, key scanning is effected to check whether or not there has been any input from key switches 326, 327, 328, . . . (step S11). Here, the line voltage level of the NCU 339 is monitored to see if the line is busy now (step S12). Then, if the line is not busy, it is judged whether or not the video switch 326 has been pressed (step S13). In the judgment at step S13, if the video switch 326 has not been pressed, the processing will be repeated from step S10. As a result, a loop B in a condition that the line is not busy and the video switch 326 has been pressed is constituted.

Further, in the judgment at step S13, if the video switch 326 has been pressed, the screen displayed on the LCD 334 in the liquid-crystal display section 305 will be erased (step 334), and the processing will be repeated from step S2. On the contrary, in the judgment at step S12, if it has been judged that the line is busy, the processing will proceed to step S16 described later. Particularly, if the line is not busy, the video image which is taken by the camera section 304 of the portable television receiver 301 can be displayed on the LCD 334 in the liquid-crystal display section 305 by turning the video switch 326 on, and, under this condition, the display on the LCD 334 in the liquid-crystal display section 305 can be erased by turning the video switch 326 off. On the other hand, it has been judged in the process of step S6 that the line is busy, then it is checked to see whether or not the reception flag is on (step S8). In case the reception flag is off (="0"), the initial setting of the display screen (LCD 334) in the liquid-crystal display section 305, which is the same as the process in step S9. Key scanning will be effected to check to see if there has been any input from key switches 326, 327, 328, . . . (step S16), and it is judged whether or not the line is busy now (step S17). In the judgement at step S17, if the line is not busy, the processing will be repeated from steps S14 and S2. Further, in the judgment at step S17, if it has been judged that the line is busy, it is judged whether or not the video switch 326 is pressed (step S18). If it has been judged that the video switch 326 has not been pressed in step S18, then the processing will be repeated from step S16. As a result, a loop C in a condition that the line is busy and the video signals are not transmitted/received is constituted. On the contrary, in the judgment at step S18, if the video switch 326 has been pressed, control goes to the processing shown in FIG. 21 explained later.

In the judgment at step S18, if the video switch 326 has been pressed, a negotiation process will be executed (step S21), and then the initial setting of the screen of the liquid-crystal display section 305 will be effected (step S22). Next, according to the control signal from the CPU 350, the image processing section 310 performs a compression/expansion process on the image data (step S23). Then, the sound processing section 311 effects a compression/expansion process on the sound data (step S24), followed by a communication process, by which the data is transmitted or received (step S25). Then, key scanning will be effected to check to see if there has been any input from key switches 326, 327, 328, . . . (step S26). Here, it is judged whether or not the line is busy now (step S27). Here, if the line is busy, the processing will be repeated from step S23. As a result, a loop D in a condition that the line is busy and the video signals are being transmitted/received is constituted. On the other hand, if the line is not busy, the processing will be repeated from steps S14 and S2. Thus, if the line is busy, the video signals can be transmitted/received by pressing the video on/off switch 326.

Explained below will be the image data compression/expansion process at step S23, the sound data compression/expansion process at step S24, and the data communication process at step S25. Because the receiver 301 of the fourth embodiment performs the image data process and the sound data process in parallel simultaneously in the transmission and reception processes, the transmission and the reception process will be explained separately below.

(Transmission process)

The image data taken by the camera section 304 is A/D converted by the ADC 342. According to the trigger signal from the CPU 350, the ADC 342 outputs a screen of image data, which is then stored in the video memory 343. In this case, the image data taken in by the camera section 304 may be not only the image taken in real-time on the calling party side but also the image data (e.g., image data on a product or a scene) previously taken and stored in the buffer memory 340. The image data stored in the video memory 343 is compressed at the image compressing/expanding circuit 341, and the compressed data is temporarily stored in the buffer memory 340. The image data stored in compressed form in the buffer memory 340 is read sequentially according to the control signal from the CPU 350. To record the image on the calling party side (the image to be transmitted) is displayed on the LCD 334 when the line is busy, the operator presses the image taking-in switch 328. Then, the image data stored in the buffer memory 340 is stored in the RAM 351. In this case, because the amount of a compressed screen of image data is 14400 bits (approximately 1.76 kilobytes), the RAM 351 has only to have an image data storing area of approximately 18 kilobytes to store 10 screens of compressed image data.

On the other hand, after the sound data from the microphone section 306 is A/D converted by the ADC 246 via the NCU 339, the converted data is compressed at the sound compressing/expanding circuit 347, and the compressed data is temporarily stored in the buffer memory 348. The sound data stored in compressed form in the buffer memory 348 is read sequentially according to the control signal from the CPU 350.

The CPU 350 reads the compressed image and sound data sequentially, combines them, and outputs the combined data to the modem 338. The supplied compressed data is modulated at the modem 338, and is D/A converted. The converted signal is then supplied from the NCU 339 via the input/output terminal T1 to the analog telephone subscriber's line.

(Reception process)

The compressed image and sound data is inputted from the analog telephone ordinary subscriber's line via the input/output terminal T1 and NUC 339 to the modem 338. The compressed data demodulated at the modem 338 is A/D converted at the DSP of the modem 338. Then, the converted data is supplied to the buffer memory 337. The demodulated compressed data in the buffer memory 337 is supplied to bus B according to the control signal from the CPU 350. The compressed data is then transferred sequentially via bus B to the CPU 350. The CPU 350 separates the combined data into the image data and the sound data. The compressed image data is temporarily stored in the buffer memory 340, and the compressed sound data is temporarily stored in the buffer memory 348.

Then, the image compressing/expanding circuit 341 sequentially reads the compressed image data from the buffer memory 340, expands it, and writes the expanded data in the video memory 344. To record the image on the other party side (the received image) displayed on the LCD 334 when the line is busy, the operator presses the image taking-in switch 328. Then, the image data stored in the buffer memory 340 is stored in the RAM 351. In this case, as explained in the above transmission process, because the amount of a compressed screen of image data is approximately 1.76 kilobytes, the RAM 351 has only to have an image data storing area of approximately 18 kilobytes to store nearly 10 screens of image data. The storage area for 10 screens may be used in such a manner that three screens are used to store transmission image data and seven screens are used to store reception image data.

On the other hand, the sound compressing/expanding circuit 347 sequentially reads the compressed sound data from the buffer memory 348, expands it, and outputs the expanded data to the DAC 349 at a constant rate. Then, the expanded analog sound data is supplied to the speaker section 307 via the NCU 339, thereby enabling the user to listen to the sound from the back of the receiver body 302. The above-described transmission and reception processes are repeated until the communication channel is disconnected. During the communication, when the state of the communication line deteriorates and the quality of pictures transferred degrades seriously, the televised image from the television tuner may be automatically displayed according to the judgment the CPU 350 made on the transferred image data. In this case, the receiver's fundamental function of receiving a television broadcast can be used.

Figure 22:
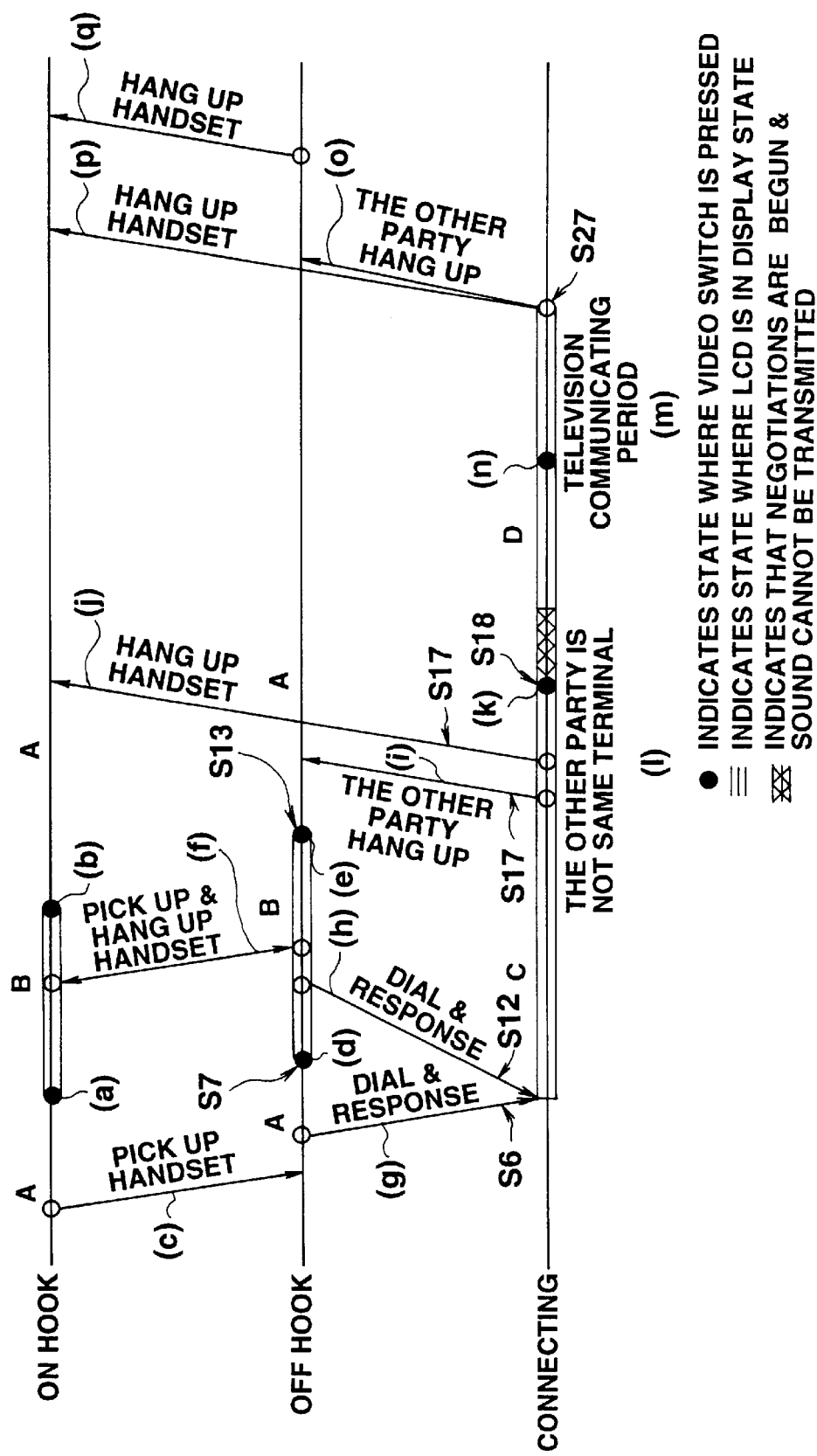
FIG. 22 is a transition diagram of the communication state during transmission in the fourth embodiment.
Figure 23:
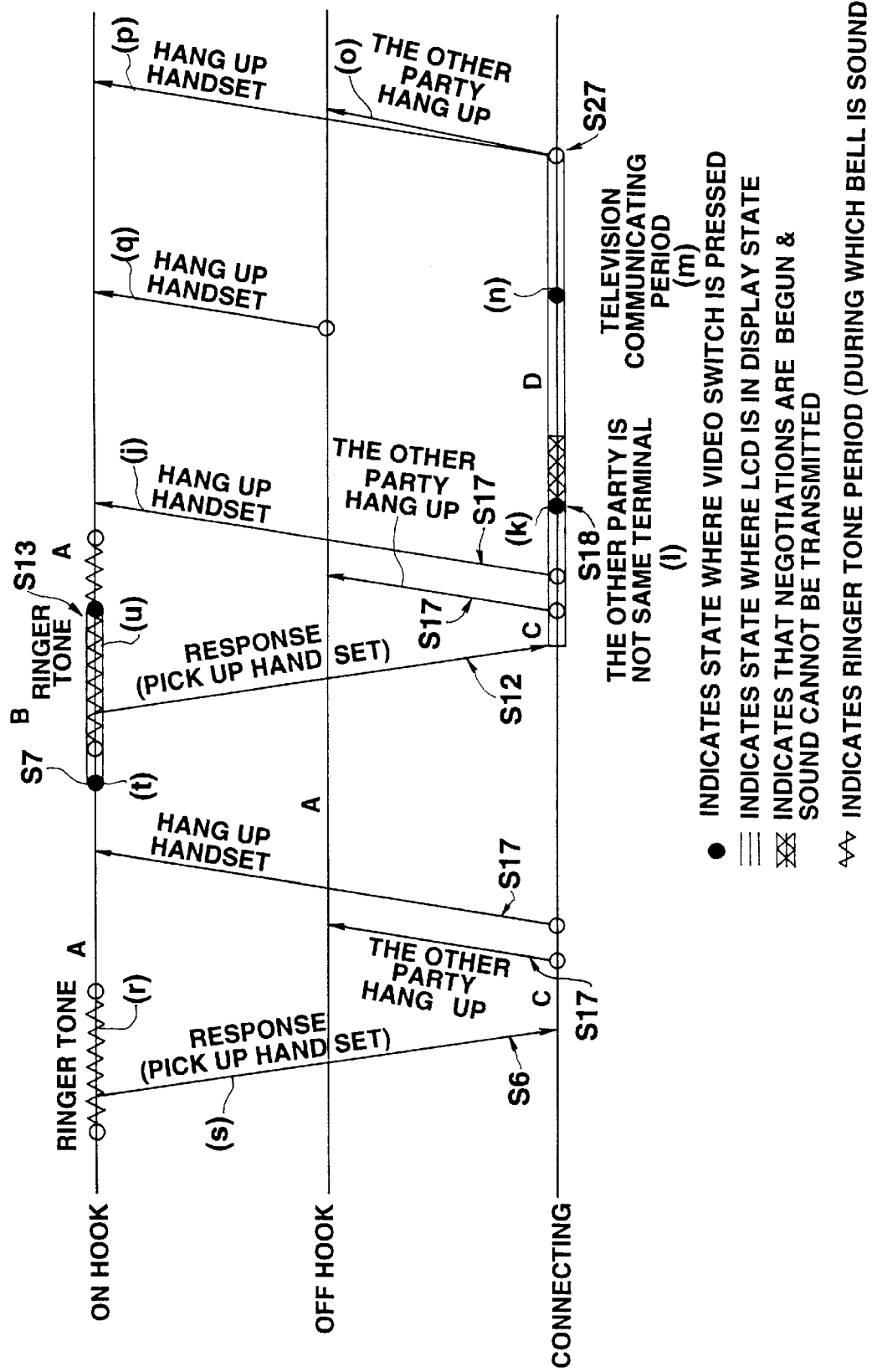
FIG. 23 is a transition diagram of the communication state during reception in the fourth embodiment.

With reference to FIGS. 22 and 23, the transmission and the reception operation will be described hereinafter. In FIGS. 22 and 23, on-hook means a state in which the receiver is not ready for communication, and off-hook means a state in which the receiver is ready for communication. Busy means a state in which after the other party's number is dialed, there is a response from the other party and a conversation is established.

FIG. 22 is a transition diagram of a communication state during transmission. The transmission operation will be explained with reference to FIG. 22. Incidentally, alphabets and steps S6, S7, S12, S13, S17, S18 and, S27 written with capital letters in FIG. 22 correspond to those of flowcharts in FIGS. 20 and 21. After the power of the receiver 301 is turned on, in the on-hook state (loop A), when the screen of the LCD 334 in the liquid-crystal display section 305 is off, pressing the video switch 326 once (see step S7 in FIG. 20 and FIG. 22 (a)) brings the LCD 334 into the display state (loop A→loop B), which allows the camera input image of the receiver 301 is displayed on the LCD 334 as a monitoring display. In this state, when the video switch 326 is pressed again (see step S13 in FIG. 20 and FIG. 22 (b)), the display on the LCD is turned off and returns to the original state (loop B→loop A). In the on-hook state (loop A), when the handset is picked up (see FIG. 22 (c)), the receiver goes to the off-hook state.

In the off-hook state (loop A), when the screen of the LCD 334 in the liquid-crystal display section 305 is off, pressing the video switch 326 once (see step S7 in FIG. 20 and FIG. 22 (d)) brings the LCD 334 into the display state, which allows the camera input image of the receiver 301 on the calling party side to be displayed on the LCD 334 (loop A→loop B), as explained in the on-hook state. In this state, pressing the video switch 326 once again (see step S13 in FIG. 20 and FIG. 22 (e)) causes the monitoring display on the LCD to turn off and return to the original off-hook state (loop B→loop A).

In the on-hook and the off-hook state, and in the state in which the LCD 334 is making a monitoring display (the triple line portion indicating on-hook and off-hook in FIG. 22), even when the handset is picked up and hung up (see FIG. 22 (f)), this only causes the receiver to change from the on-hook to the off-hook or from the off-hook to the on-hook, and the monitoring display on the LCD 334 remains unchanged. Regardless of whether the LCD 334 is making the monitoring display or is off, when the other party's number is dialed in the off-hook state and communication is established with the other party (see steps S6 and S12 in FIG. 20 and FIG. 22 (g) and (h)), the receiver goes to the busy state and the LCD 334 makes the monitoring display on the calling side (loop C). In this state, when the other party hangs up the telephone (see step S17 in FIG. 20 and FIG. 22 (i)), the receiver goes to the off-hook state, thus causing the LCD 334 to stop making the monitoring display (loop C→loop A). When the calling party hangs up the telephone in the busy state (see step S17 in FIG. 20 and FIG. 22 (j)), the receiver goes to the on-hook state, thus causing the LCD 334 to stop making the monitoring display.

In the busy state (loop C), when the LCD 334 is making a monitoring display on the calling party side, pressing the video switch 326 (see step S18 in FIG. 20 and FIG. 22 (k)) starts negotiations with the other (called) party's terminal for communication. If the results of the negotiations show that the communication between the called and the calling party is impossible (see FIG. 22 (l)), the receiver will return to the state in which it was before the video switch 326 was pressed. If the communication between the called and the calling party is possible, a television communicating period section is established (see FIG. 22 (m)). From this time on, a mutual communication of image and sound data is carried out (loop C→loop D). In this state, even if the video switch 326 is pressed many times, it will be ignored (see FIG. 22 (n)). In this state (loop D), when the other party hangs up the telephone (see step S27 in FIG. 21 and FIG. 22 (o)), the receiver will go to the on-hook state, thus causing the LCD 334 to stop making the monitoring display (loop D→loop A). When the calling party hangs up the receiver (see step S27 in FIG. 21 and FIG. 22 (p)), the receiver will go to the on-hook state, thus causing the LCD 334 to stop making the monitoring display (loop D→loop A).

When the receiver is in the off-hook state and the LCD 334 is not making a monitoring display, hanging up the receiver brings the receiver to the on-hook state (see FIG. 22 (q)).

FIG. 23 is a transition diagram of a communication state during reception. Next, the reception operation will be described with reference to FIG. 23. Explanation of those items explained in the above transmission operation will be omitted. In FIG. 23, the sections indicated by zigzag lines represent periods of time during which a ringer tone sounds or the telephone rings. During the ringer tone period (loop A) (see FIG. 23 (r)), when the reception side picks up the receiver and answers the telephone (see step S6 in FIG. 20 and FIG. 23 (s)), the receiver goes to the busy state. Unlike the transmission side, on the reception side, the LCD 334 does not make the monitoring display and remains off (loop A→loop C). However, in the on-hook state (loop A), pressing the video switch 326 once (see step S7 in FIG. 20 and FIG. 23 (t)) causes the LCD 334 to make the monitoring display, making it possible to monitor the reception side (loop A→loop B). At this time, a ringer tone is generated (see FIG. 23 (u)). Responding to this ringer tone (see step S12 in FIG. 20 and FIG. 23 (v)) brings the receiver into the busy state, permitting the LCD 334 to keep making the monitoring display. The video switch 326 is active even when the receiver is in the on-hook state and in the ringer tone period.

As has been explained above, with the fourth embodiment, a high-quality picture is transferred through an analog telephone ordinary subscriber's line by simultaneously transferring the image and sound data compressed by the modulation/demodulation section 309 and dividing a screen of image data (211200 bits) displayed on the LCD 334 into three pieces and transferring them on the basis of the data compression factor (nearly $7/100$) at the image compressing/expanding circuit 341 and the image data transfer speed (4800 bps) of the modulation/demodulation section 309. Because the screen size of the LCD 334 is 1.4 inch and a screen has 110×160 pixels×12 bits (4096 colors)= 211200 bits of data, image data is transferred at a rate of one frame in three seconds. As the number of pixels and that of colors (the number of gradations) per screen increases or decreases, the time required to transfer a screen of image data is changed. Specifically, for instance, it is assumed that a mode in which image data is transferred in 4096 colors is a normal mode, and a mode in which a representation with the same number of pixels (110×160 pixels) in 65536 colors (16 bits) is made is a high picture-quality mode. To transfer the image data in the high picture-quality mode, the amount of a screen of image data comes to 110×160×16=281600 bits (approximately 34.4 kilobytes). These bits of data is compressed by the image compression process at a ratio of nearly $68/1000$ into 19200 bits of image data. Intermittent still images are thus transferred at a rate of one frame during the period of time obtained by dividing the 19200 bits by the number of bits (4800 bits) that can be transferred in a second (i.e., 19200÷4800=4 seconds). In this case, 70400 bits (approximately 8.6 kilobytes) of image data obtained by dividing 281600 bits by 4 is compressed at a rate of approximately $68/1000$ and converted into a video code containing 4800 bits of image data, as shown in FIG. 19.

In this way, with the fourth embodiment, it is possible to achieve a high-quality image transfer while making use of the primary feature of the videophone that enables the user to talk over the phone while watching the other party's face.

Figure 24:
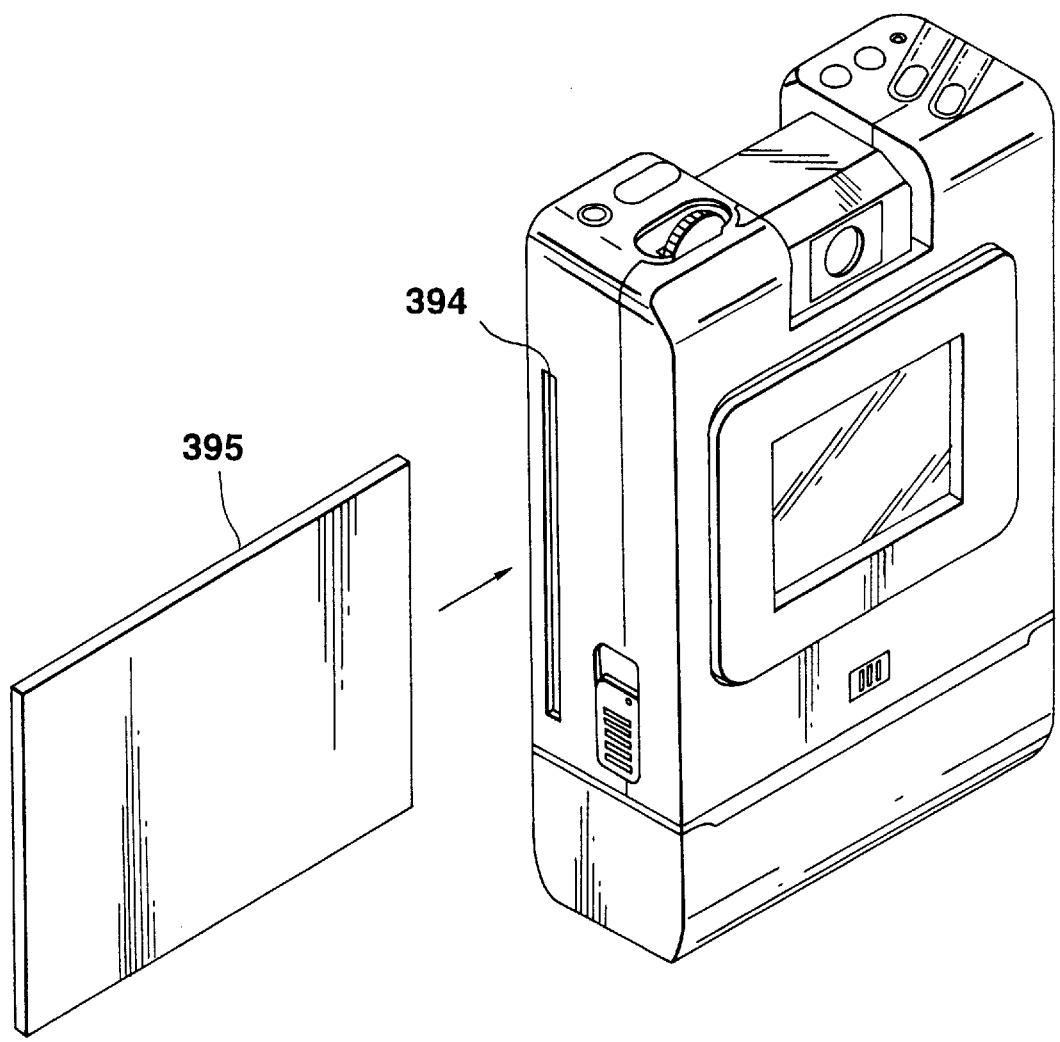
FIG. 24 is a perspective view of an application where a card memory is applied to the portable television receiver of the fourth embodiment.

With a conventional equivalent, to record the image to be transmitted, an additional recording device (e.g., an audio cassette tape recorder) is required. However, this embodiment is provided with the RAM 351 with a large storage capacity. Therefore, to record the image taken by the camera section 304, pressing the image taking-in switch 328 enables the desired image to be retained easily. In this case, instead of the RAM 351, a memory card 395, as shown in FIG. 24, composed of nonvolatile flash memory or the like may be used. Storing the images to be transmitted in each memory card 395 makes it possible to retain different sets of images by changing memory cards. When the memory card 395 is inserted into a memory card slot 394, data can be read from and written into it via bus B. In this case, for example, by installing the memory card 395 storing pieces of image data in a video printer 396 as shown in FIG. 25, the image data stored in the memory card 395 can be printed out.

Figure 25:
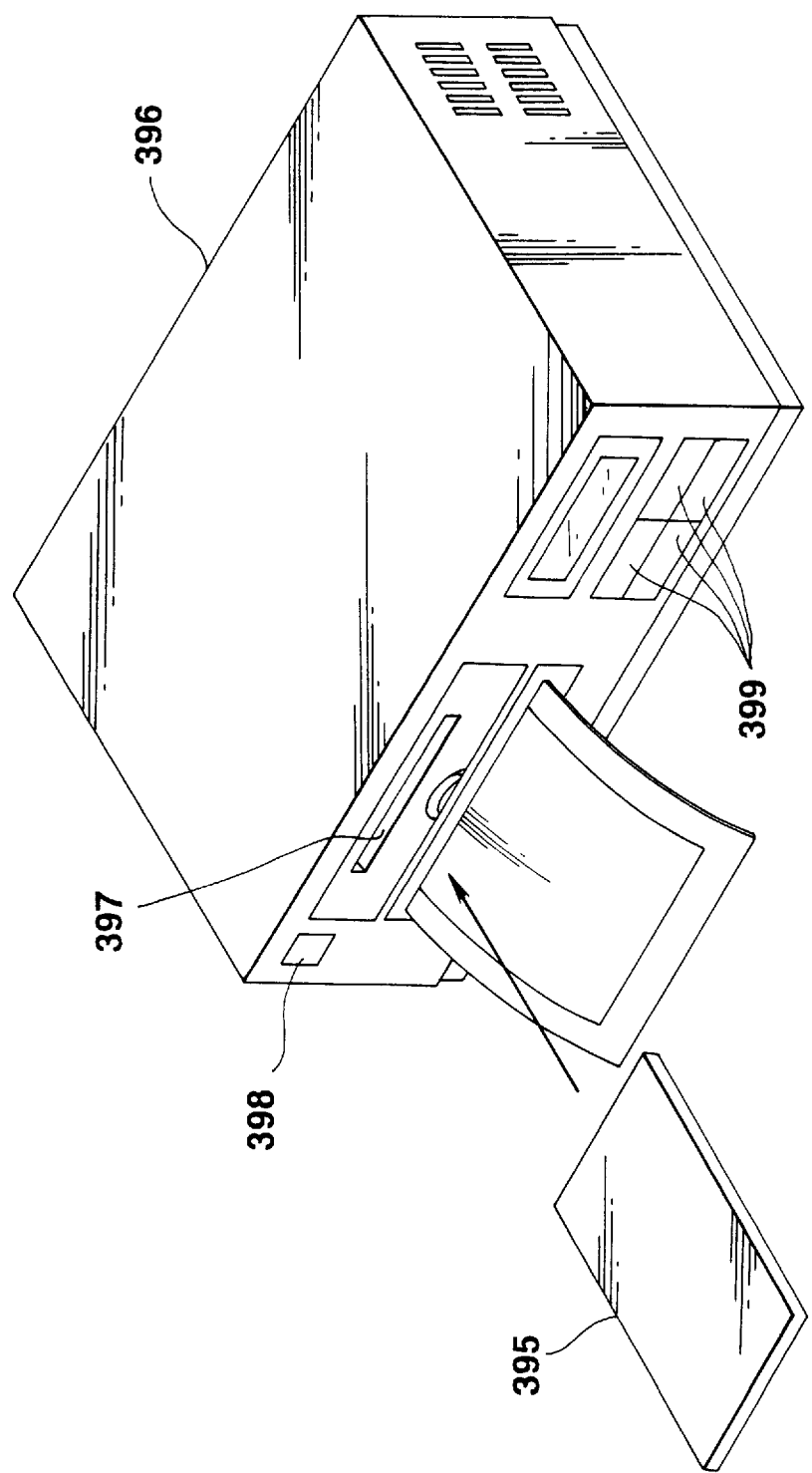
FIG. 25 is a perspective view of an embodiment of a video printer used to print the image data stored in the card memory applied in FIG. 24.

FIG. 25 is a perspective view of the video printer 396 used to print the image data stored in the card memory in FIG. 24. In FIG. 25, numeral 397 indicates a slot into which the memory card 395 is inserted, 398 a power switch, and 399 various operation switches. This video printer 396 is a sublimation heat-transfer color printer which can print in 16,770,000 colors. Specifically, after the memory card 395 is inserted into the slot 397 of the video printer 396, the power switch is turned on. The various switches 399 are operated to select a particular piece of image data stored in the memory card 395. The selected image data is printed out on a A6-size dedicated sheet.

Conventional videophones are generally manufactured on the assumption that they are installed in a room. Therefore, once they are installed in a place, it is not easy to move them to another place where the user wants to telephone. In such a conventional receiver, the camera section acting as an image input section, the CRT acting as an image display section, and a telephone acting as an audio input/output section are formed integrally to transfer the compressed data. This arrangement makes it difficult to make the receiver more compact and lighter. Because of this drawback, it has been difficult to develop a portable videophone and impossible to make use of existing telephones. With the fourth embodiment, since the picture quality of recent liquid-crystal display units has been improved much, a color TFT liquid-crystal display unit is used for the display section in place of a conventional CRT, thereby reducing the power consumption and making the receiver more compact and lighter. In this case, using a small flat fluorescent tube for a backlight in the liquid-crystal unit enables the LCD 334 to be much thinner, thereby making the unit compact and light remarkably.

With a conventional videophone, because the camera section is fixed to the body, the field of vision is limited. However, with the receiver 301 of this embodiment, because the compact CCD camera located in the center of the receiver body 302 is attached to the body 302 by a rotating shaft (not shown) so as to rotate freely, it is possible to change the field of vision of the camera section 304 without changing the position of the body 302. Therefore, the operator can take a picture (take in an image) as he or she wants to regardless of the position of the body 302. Further, when the ADC 342 to which the television tuner section 308 supplies the input signal is provided with a composite video input/output terminal, an analog/digital RGB input/output terminal, or the like as the video input terminal, it can be connected to video equipment including a video cassette recorder (VCR) and a laser disk player (LDP) or a computer. For instance, by connecting a video cassette recorder with a video output terminal to the ADC 342, a video image can be displayed on the liquid-crystal display section 305.

The image data compressing method is not limited to the JPEG algorithm of the fourth embodiment. For instance, a block coding method, a predictive coding method, or an orthogonal transform coding method may be used to compress the image data. Further, the sound data compressing method is not restricted to the CELP algorithm of the fourth embodiment. For instance, the AD-PCM (Adaptive Differential Pulse Code Modulation) method or the VSELP (Vector Sum Excited Linear Prediction) method may be used to compress the sound data.

While in the fourth embodiment, the speaker section 307 is used to provide the sound output, the invention is not limited to this. For instance, instead of using the speaker section 307, an audio output terminal may be provided for the NCU 339 in FIG. 18, and also be used as the earphone terminal 325, thereby allowing the user to listen to the sound via an earphone (not shown). In this case, as compared with the above embodiments, the receiver body 302 can be reduced in size as much as the space needed for the speaker. In addition, the power required for the amplifier to drive the speaker can be eliminated.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pocket-size imaging and display apparatus including a case, comprising:

a camera section rotatably coupled to the case, the camera section including an imaging plane;

image data generating means for generating image data corresponding to an image taken by said camera section;

a display section coupled to the case for displaying the image data generated by said image data generating means, the display section including a display screen plane, the imaging plane of said camera section and the display screen plane of the display section are positionally changed relative to each other in response to a rotation of said camera section;

means for compressing the image data generated by said image data generating means;

means for modulating the image data compressed by said compressing means; and a telephone line jack coupled to the case and selectively connected to a telephone line in order to output the image data modulated by said modulating means to the telephone line.

2. A pocket-size imaging and display apparatus comprising:

a display section; and a camera section including an imaging unit for providing image data, said camera section being smaller in size than said display section;

wherein said display section comprises:

means for compressing image data provided by said imaging unit;

a memory section for storing plural sets of said image data compressed by said compressing means;

means for playing back said image data stored in said memory section; and means for selectively displaying said image data played back by said playing back means and said image data taken. by said imaging unit, said selectively displaying means comprising a liquid-crystal display device having a back light including a flat fluorescent tube.

* * * * *